United States Patent
Burch et al.

(10) Patent No.: US 12,200,149 B2
(45) Date of Patent: Jan. 14, 2025

(54) BLOCKCHAIN DATA FORGETABILITY

(71) Applicant: MICRO FOCUS LLC, Santa Clara, CA (US)

(72) Inventors: Lloyd L. Burch, Provo, UT (US); Michael F. Angelo, Houston, TX (US); Baha Masoud, Santa Clara, CA (US); Larry Hal Henderson, Provo, UT (US)

(73) Assignee: Micro Focus LLC, Santa Clara, CA (US)

( * ) Notice: Subject to any disclaimer, the term of this patent is extended or adjusted under 35 U.S.C. 154(b) by 243 days.

(21) Appl. No.: 17/632,719

(22) PCT Filed: Dec. 23, 2019

(86) PCT No.: PCT/US2019/068330
§ 371 (c)(1),
(2) Date: Feb. 3, 2022

(87) PCT Pub. No.: WO2021/040773
PCT Pub. Date: Mar. 4, 2021

(65) Prior Publication Data
US 2022/0286304 A1    Sep. 8, 2022

Related U.S. Application Data

(60) Provisional application No. 62/892,715, filed on Aug. 28, 2019.

(51) Int. Cl.
*H04L 29/06* (2006.01)
*H04L 9/00* (2022.01)
*G06Q 20/02* (2012.01)

(52) U.S. Cl.
CPC ............. *H04L 9/50* (2022.05); *G06Q 20/02* (2013.01); *G06Q 2220/00* (2013.01)

(58) Field of Classification Search
CPC ...... H04L 9/50; G06Q 20/02; G06Q 2220/00; G06Q 20/06; G06Q 20/3827; G06Q 20/3674
See application file for complete search history.

(56) References Cited

U.S. PATENT DOCUMENTS

| | | |
|---|---|---|
| 10,277,561 B2 | 4/2019 | Cox |
| 10,304,062 B1 | 5/2019 | Hines |
| 11,232,221 B2 | 1/2022 | Novotny |

(Continued)

FOREIGN PATENT DOCUMENTS

WO    WO-2019086553 A1    5/2019

OTHER PUBLICATIONS

Doubleday, et al; Why Blockchain immutability matters; Hackernoon; https://hackernoon.com/why-blockchain-immutability-matters; Oct. 18, 2019; 12 pages.

(Continued)

*Primary Examiner* — Harunur Rashid
(74) *Attorney, Agent, or Firm* — Sheridan Ross P.C.

(57) ABSTRACT

To write forgettable data to a blockchain, the forgettable data is transmitted to a server, from which encrypted data corresponding to the forgettable data are received. A hash of the forgettable data is generated. A data block including the encrypted data and control data including the hash is added to the blockchain.

21 Claims, 15 Drawing Sheets

(56) References Cited

U.S. PATENT DOCUMENTS

| | | | |
|---|---|---|---|
| 2017/0177898 A1* | 6/2017 | Dillenberger | H04L 9/3236 |
| 2017/0338957 A1* | 11/2017 | Ateniese | H04L 9/085 |
| 2018/0204191 A1* | 7/2018 | Wilson | H04L 9/30 |
| 2019/0044714 A1 | 2/2019 | Parker | |
| 2019/0074962 A1 | 3/2019 | Ateniese | |
| 2020/0092088 A1* | 3/2020 | Novotny | G06F 21/64 |
| 2020/0314151 A1* | 10/2020 | Schoinianakis | H04L 9/085 |

OTHER PUBLICATIONS

International Search Report & Written Opinion; PCT/US2019/068330; Mailed Mar. 25, 2020; 8 pages.

Politou, et al; Blockchain Mutability-Challenges & Proposed; Department of Informatics, University of Piraeus; Jul. 16, 2019; 13 pages.

Truong, et al; GDPR-Compliant personal data management—A blockchain based solution; IEEE Transaction On Information Forensics And Security; Oct. 2019; 16 pages.

* cited by examiner

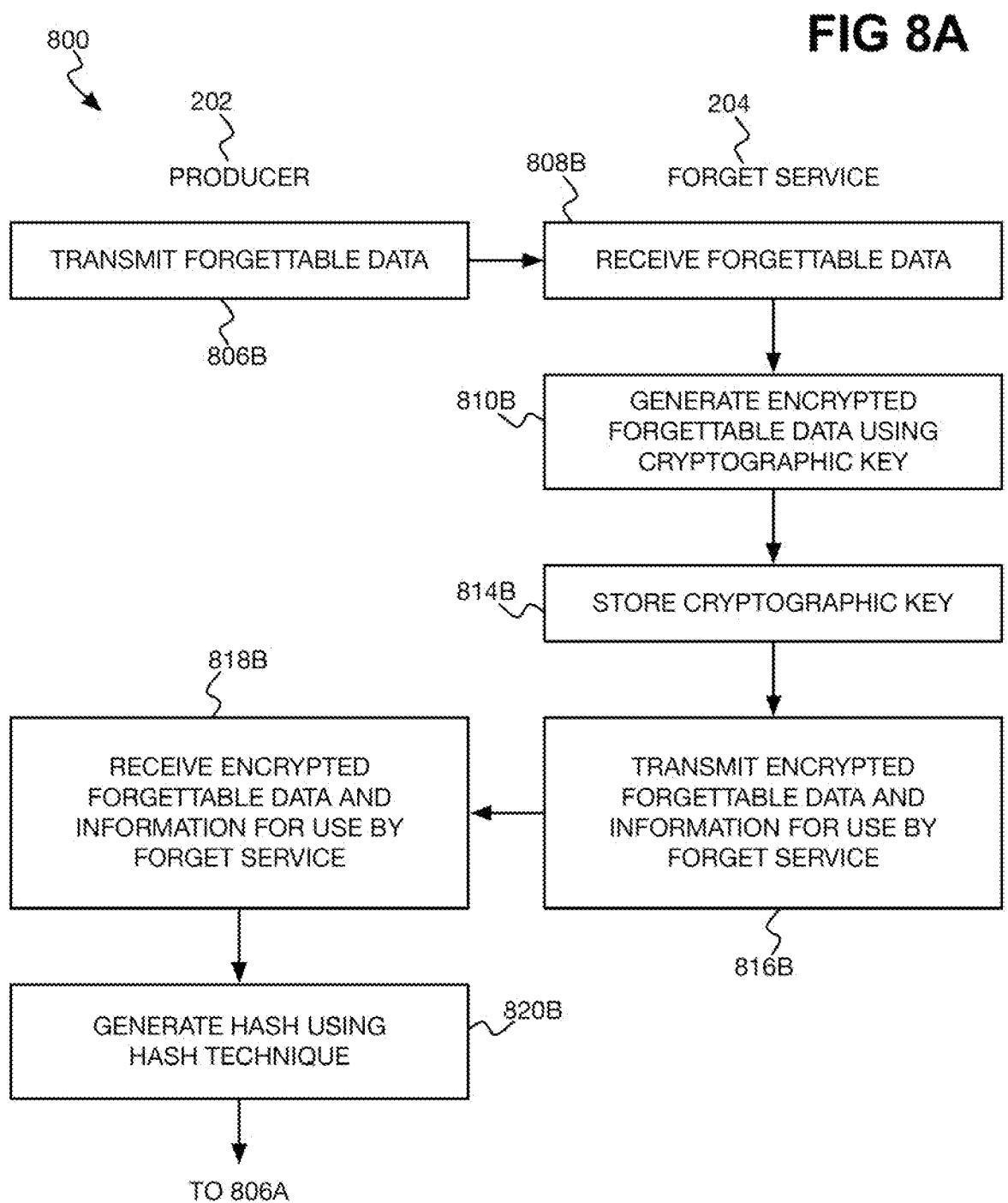

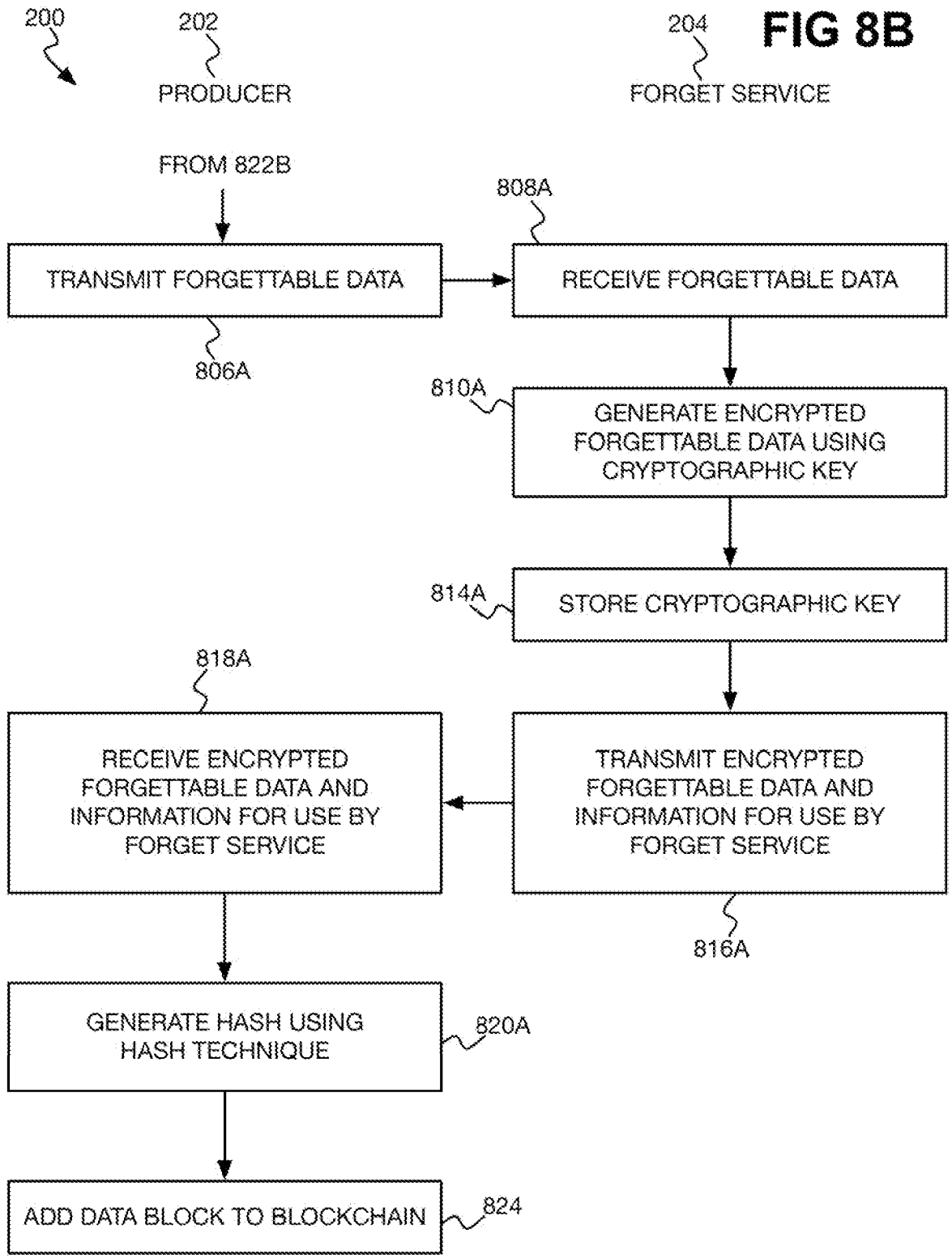

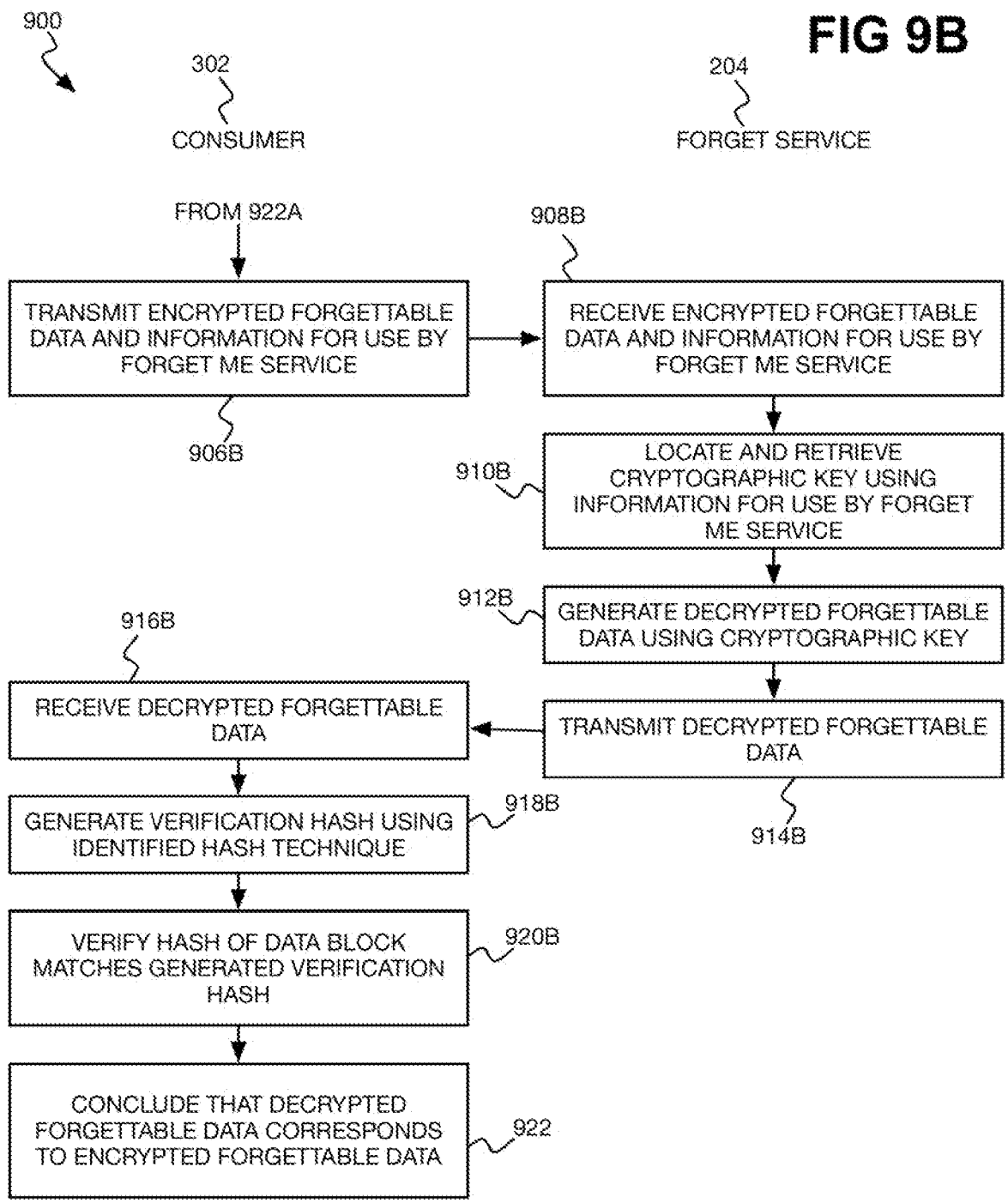

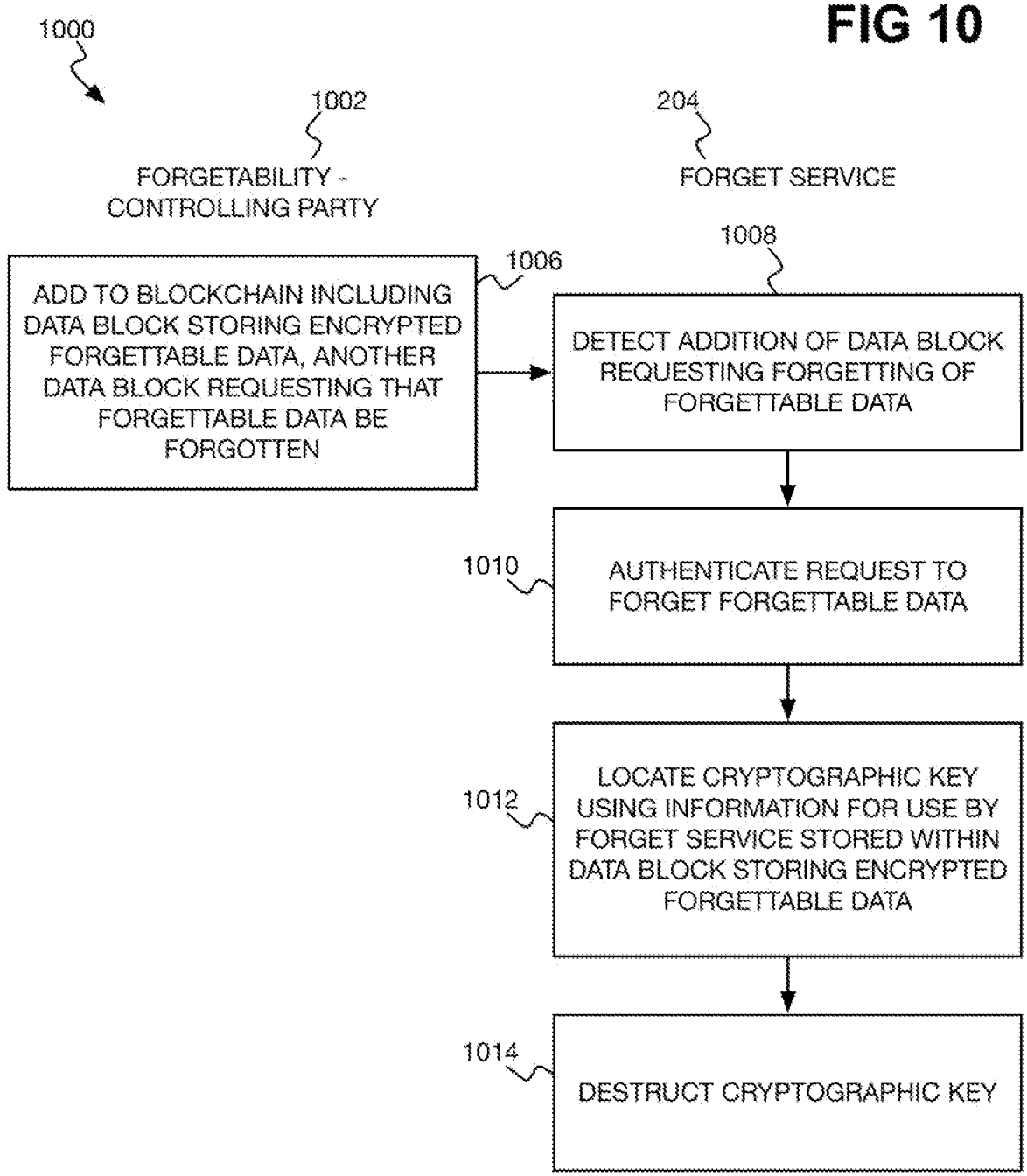

BLOCKCHAIN DATA FORGETABILITY

BACKGROUND

A blockchain is a distributed database that maintains a continuously growing list of ordered records referred to as blocks. A blockchains can be used as an open, distributed ledger to record transactions among parties efficiently and in a verifiable manner. Each block of a blockchain is linked to a previous block within the blockchain. Blockchains are suitable for the recording of events, records, transaction processing, and proving provenance. Verification of the data contained with blocks is achieved in a distributed consensus manner, in which data integrity is maintained in part by database replication and computational trust.

BRIEF DESCRIPTION OF THE DRAWINGS

FIGS. 8A and 8B are flowcharts of an example method for writing forgettable data, the forgetability of which is independently controlled by multiple parties, to a blockchain.

FIGS. 9A and 9B are flowcharts of an example method for retrieving forgettable data, the forgetability of which is independently controlled by multiple parties, from a blockchain.

FIG. 10 is a flowchart of an example method for forgetting forgettable data stored in a blockchain.

DETAILED DESCRIPTION

Figure 1:
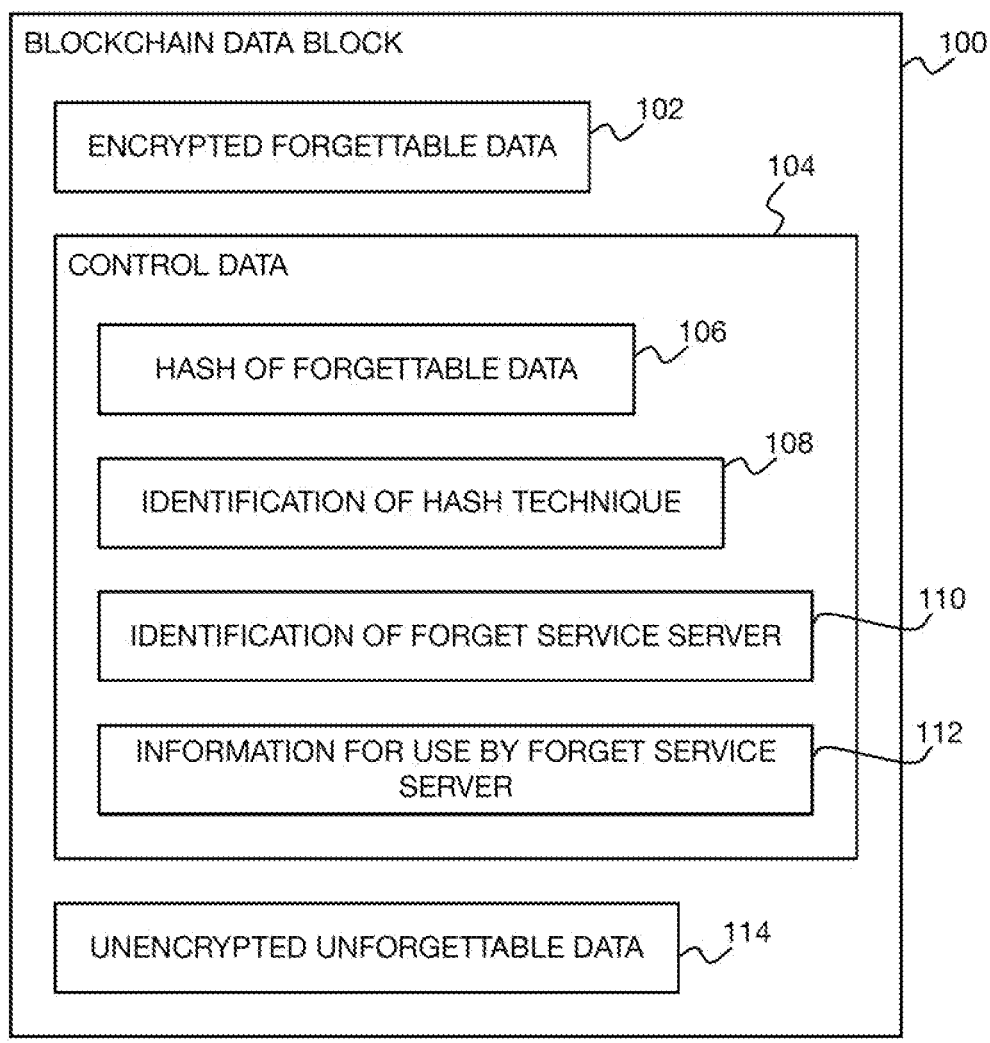
FIG. 1 is a diagram of an example blockchain data block including encrypted forgettable data.

As noted in the background section, blockchains are distributed databases that maintain continuously growing lists of ordered blocks. Blockchains reduce the costs involved in verifying transactions, including by removing the need for trusted third parties to complete transactions. This has permitted blockchains to be employed for the creation of cryptocurrencies, the most common of which is Bitcoin. However, blockchain technology has applicability to other types of data as well.

A hallmark of any blockchain is that data written to a blockchain is immutable. That is, once data has been stored in a blockchain, it cannot be altered retroactively. This is problematic for storing data in a blockchain that may later be desired to be deleted from the blockchain. For example, various governmental and other regulations require that the owner of data be permitted to request at a later date that the data be "forgotten," and thus deleted, removed, or otherwise rendered irretrievable.

Techniques described herein provide a forget service that permits blockchains to be used to store forgettable data, while still permitting the data to be subsequently forgotten. A forget service maintains a cryptographic key for forgettable data stored in a blockchain. Rather than storing the forgettable data in plaintext, an encrypted version of the data is instead stored in the blockchain. The cryptographic key is necessary (but not necessarily sufficient) to retrieve or generate—i.e., decrypt—the forgettable data from the encrypted data that is actually stored in the blockchain.

A party controlling forgetability of the data controls the ability to cause destruction of the cryptographic key used to generate the forgettable data from the encrypted data that is stored in the blockchain. If the cryptographic key is destructed at the forget service, there is no way to retrieve the forgettable data, and the data is thus forgotten. The forget service therefore provides for blockchain data forgetability, by maintaining cryptographic keys for forgettable data stored in encrypted fashion blockchains, and by destructing the keys responsive to requests from the parties controlling the forgetability of the data.

The forget service, however, may guarantee just the forgetability of data stored in a blockchain, and may not guarantee immutability of the data. Stated another way, the blockchain itself still guarantees immutability of the data. For instance, simply storing encrypted data in a blockchain, where a trusted third party, like the forget service, maintains the decryption key used to decrypt the encrypted data, would mean that the forget service itself also controls immutability of the data, as opposed to the blockchain.

This is because there is no way to verify that the decrypted data returned by the third party is the forgettable data stored in encrypted form in the blockchain. For example, the third party may be presented with encrypted data retrieved from a blockchain, and responsively return decrypted data to the requestor. The requestor in such instance has no way to verify that the decrypted data is the actual forgettable data that is stored in encrypted fashion in the blockchain.

If the third party is malicious or has been compromised, for instance, it could return any data to the requestor. The requestor has to take on faith that the decrypted data is the forgettable data that is stored in encrypted form in the blockchain. In such instance, the guarantor of data immutability has in effect been transferred from the blockchain itself to the third party, defeating one of the advantages of using a blockchain in the first place.

Techniques described herein overcome this issue, preserving the blockchain as the guarantor of immutability of forgettable data stored in encrypted fashion in the blockchain. When a producer wishes to write forgettable data to a blockchain, it transmits the forgettable data to a forget service, which returns encrypted data corresponding to the forgettable data. The producer generate a hash of the forgettable data, and writes the encrypted data and the hash to the blockchains.

In turn, when a consumer wishes to retrieve the forgettable data from the blockchain, it transmits (at least) the encrypted data stored in the blockchain to the forget service. The forget service in turn returns decrypted data purportedly corresponding to the encrypted data (assuming that the party controlling forgetability of the data has not in the interim caused destruction of the cryptographic key at the forget service that is used to decrypt the encrypted data). The consumer, however, does not have to take the forget service at its word that the decrypted data is the forgettable data to which the encrypted data corresponds.

Rather, the consumer can generate a verification hash from the received decrypted data. The consumer compares the verification hash that it has generated to the hash stored in the blockchain with the encrypted data. If the verification hash matches the hash stored in the blockchain, then the consumer knows that the decrypted data is indeed the forgettable data that the encrypted version of which is stored in the blockchain. The immutability of the forgettable data is thus still guaranteed by the blockchain itself.

FIG. 1 shows an example blockchain data block 100. The data block 100 includes encrypted forgettable data 102. The encrypted forgettable data 102 is the encrypted version of forgettable data. The forgettable data is not itself stored in plaintext (i.e., unencrypted) in the blockchain, such as in the data block 100, but rather just the encrypted version of the forgettable data—i.e., the encrypted forgettable data 102—is stored in the blockchain.

The blockchain data block 100 includes control data 104 that is stored with the encrypted forgettable data 102. The control data 104 includes a hash 106. The hash 106 is a hash of the forgettable data to which the encrypted forgettable data 102 corresponds. The control data 104 can include identification 108 of the hash technique used to generate the hash 106 from the forgettable data.

The control data 104 can include identification 110 of a forget service server. The terminology server is used herein in a general sense, and includes any type of computing device. To retrieve the forgettable data to which the encrypted forgettable data 102 corresponds, a party transmits the encrypted forgettable data 102 to the identified forget service server. The party then receives from the server decrypted data that is purportedly the forgettable data to which the encrypted forgettable data 102 corresponds. A party is a user or entity, and that the party performs functionality like sending, receiving, determining, and so on, means that a computing device of the party performs the functionality in question.

The control data 104 can also include information 112 for use by the forget service server decrypting the provided encrypted forgettable data 102 to generate the forgettable data to which the encrypted forgettable data 102 corresponds. For example, such information 112 can include identifying information that the server uses to retrieve or locate the cryptographic key. Therefore, to retrieve the forgettable data to which the encrypted forgettable data 102 corresponds, a party transmits the information 112 along with the encrypted forgettable data 102 to the forget service server.

The blockchain data block 100 can also include unencrypted unforgettable data 114. The data 114 is unforgettable in that the data 114 is not encrypted, and thus not decryptable using a cryptographic key maintained at the forget service. However, because the unencrypted unforgettable data 114 is stored in the data block 100, immutability of the data 114 is still guaranteed by the blockchain itself.

Figure 2:
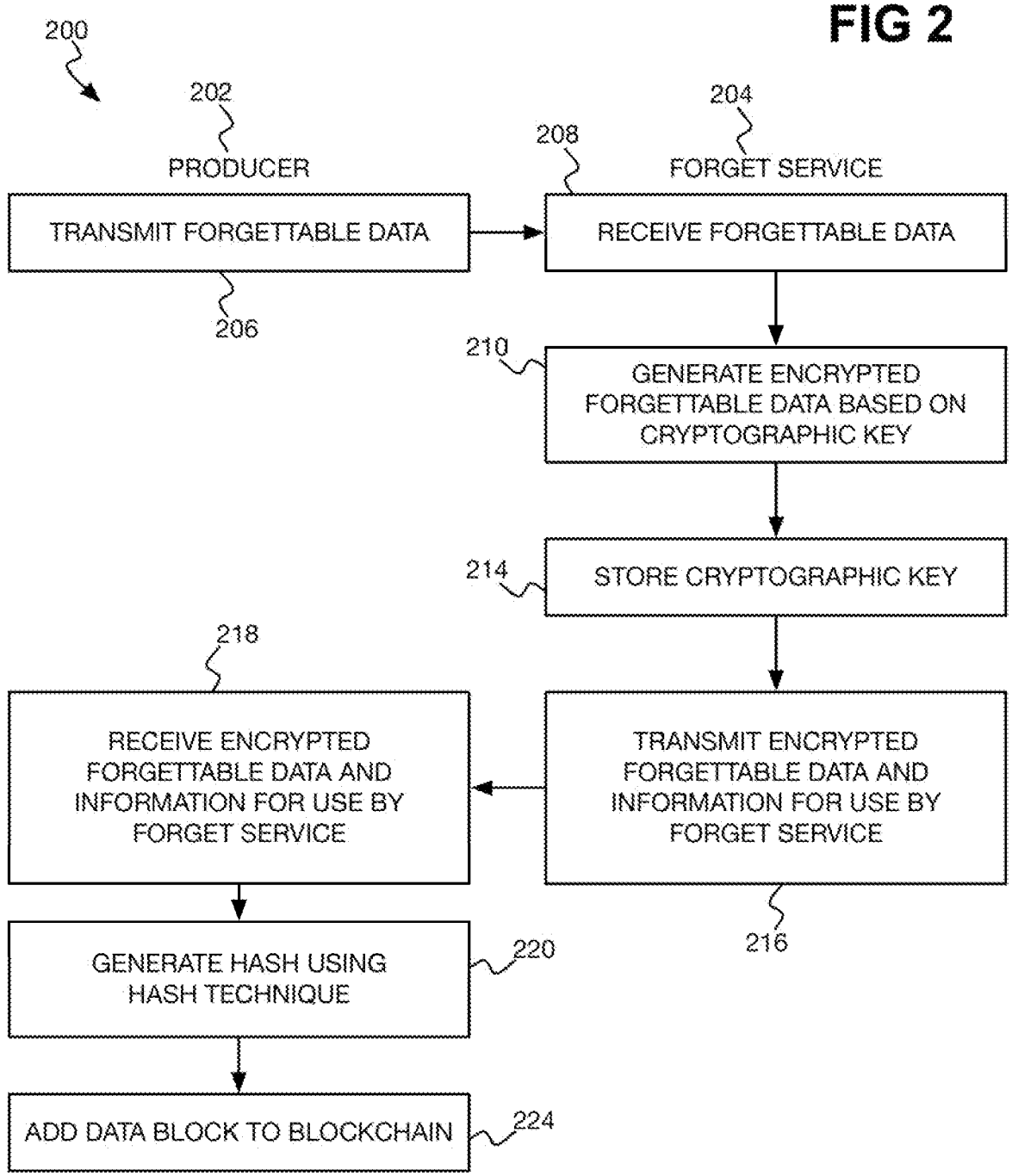
FIG. 2 is a flowchart of an example method for writing forgettable data to a blockchain.

FIG. 2 shows an example method 200 for writing forgettable data to a blockchain, such as to the blockchain data block 100 of FIG. 1. The parts of the method 200 in the left column are performed by a party that is referred to herein for distinguishing purposes only as a producer 202. The producer 202 may be a user or other type of entity. The parts of the method 200 in the right column are performed by a forget service 204 that guarantees forgettability of the forgettable data. The service 204 may be managed or run by an entity that provides the service 204 to the producer 202.

The method 200 may be implemented as program code stored on non-transitory computer-readable data storage media. For example, a computing device of the producer 202 may execute the program code to perform the parts of the method 200 in the left column. Similarly, a computing device of the forget service 204, which can be referred to as a forget service server, may execute the program code to perform the parts of the method 200 in the right column.

The producer 202 transmits forgettable data to the forget service 204 (206). Upon receiving the forgettable data (208), the forget service 204 generates encrypted forgettable data based on a cryptographic key (210). That is, the forget service 204 generates an encrypted version of the received forgettable data based on the cryptographic key. The forget service 204 does not maintain any copy of the forgettable data. That is, once the forgettable data has been encrypted, the forget service 204 irreversibly destructs the received unencrypted forgettable data.

The encrypted forgettable data may be said to be generated based on the cryptographic key in that the cryptographic key is needed to subsequently decrypt the forgettable data from the encrypted forgettable data (i.e., generate the decrypted forgettable data from the encrypted forgettable data). As one example, the cryptographic key may be a symmetric cryptographic key that is used to both encrypt the forgettable data to generate the encrypted forgettable data and decrypt the encrypted forgettable data to generate the forgettable. As another example, the cryptographic key may be the private key of an asymmetric cryptographic key pair, with the forgettable data actually encrypted using the public key.

The forget service 204 stores the cryptographic key by which the forgettable data is decrypted from the encrypted forgettable data generated in part 210 (214). The forget service 204 maintains sole possession of the cryptographic key. Therefore, if the forget service 204 destructs the cryptographic key, such as at the request of the party that controls forgetability of the forgettable data, the forgettable data cannot be decrypted from the encrypted forgettable data and thus is effectively forgotten.

The forget service 204 may store the cryptographic key via a trusted platform module (TPM), or in another manner by which the cryptographic key is invulnerable to or at least highly resistant to malicious attacks against the service 204 to obtain the key. The forget service 204 stores the cryptographic key in such a secure manner because the service 204 is the guarantor of the forgetability of the forgettable data. That is, if the forget service 204 destructs the cryptographic key (i.e., deletes, removes, or destroys the key in an irreversible manner), then there is no other copy of the key by which the forgettable data can be decrypted from the encrypted data stored in a blockchain.

The forget service 204 transmits back to the producer 202 the encrypted forgettable data generated in part 210 and (other) information for (internal) use by the forget service 204 (216). The latter information can include identifying information of the cryptographic key, to permit the forget service 204 to subsequently locate the key as stored in part 214. Therefore, when the forget service 204 later receives a request to decrypt encrypted forgettable data retrieved from a blockchain, it is able to locate the cryptographic key to generate the decrypted forgettable data.

The producer 202 receives the encrypted forgettable data and the other information that the forget service 204 has transmitted (218). Using a hash technique, the producer 202 generates a hash of the forgettable data that it transmitted to the forget service 204 in part 206 (220). The producer 202 adds a data block to the blockchain (224). For example, the blockchain data block of FIG. 1, which also includes unencrypted unforgettable data 114, may be added to the blockchain in part 224.

The data block added to the blockchain in part 224 includes the encrypted forgettable data received from the forget service 204 in part 218, as well as the hash. The data block can also include identification of the hash technique used to generate the hash, which permits different hash techniques to be employed for different forgettable data stored in the blockchain. The data block can include the other information that permits the forget service 204 to locate the previously stored cryptographic key that is used to generate the decrypted forgettable data from the encrypted forgettable data.

The data block added to the blockchain in part 224 can further include identification of a server of the forget service 204 to which the encrypted forgettable data should subsequently be sent for decryption after having been retrieved from the data block added to the blockchain. The server identified in the data block may be the server to which the producer 202 transmitted the forgettable data in part 206. The server may instead be a server identified by the forget service 204 with the information it transmits to the producer 202 in part 216.

The hash that the producer 202 generated from the forgettable data in part 220 ensures that immutability of the forgettable data remains guaranteed by the blockchain itself, and is not transferred to the forget service 204. Without the hash, the forget service 204, if malicious or has been compromised, could return any data as the forgettable data when later presented with a request to decrypt the encrypted forgettable data, without any way of detecting that the returned data is not the forgettable data. With the hash, it can be verified that the data returned by the forget service 204 is the forgettable data to which the encrypted forgettable data corresponds, as described in more detail later with reference to FIG. 3.

Figure 3:
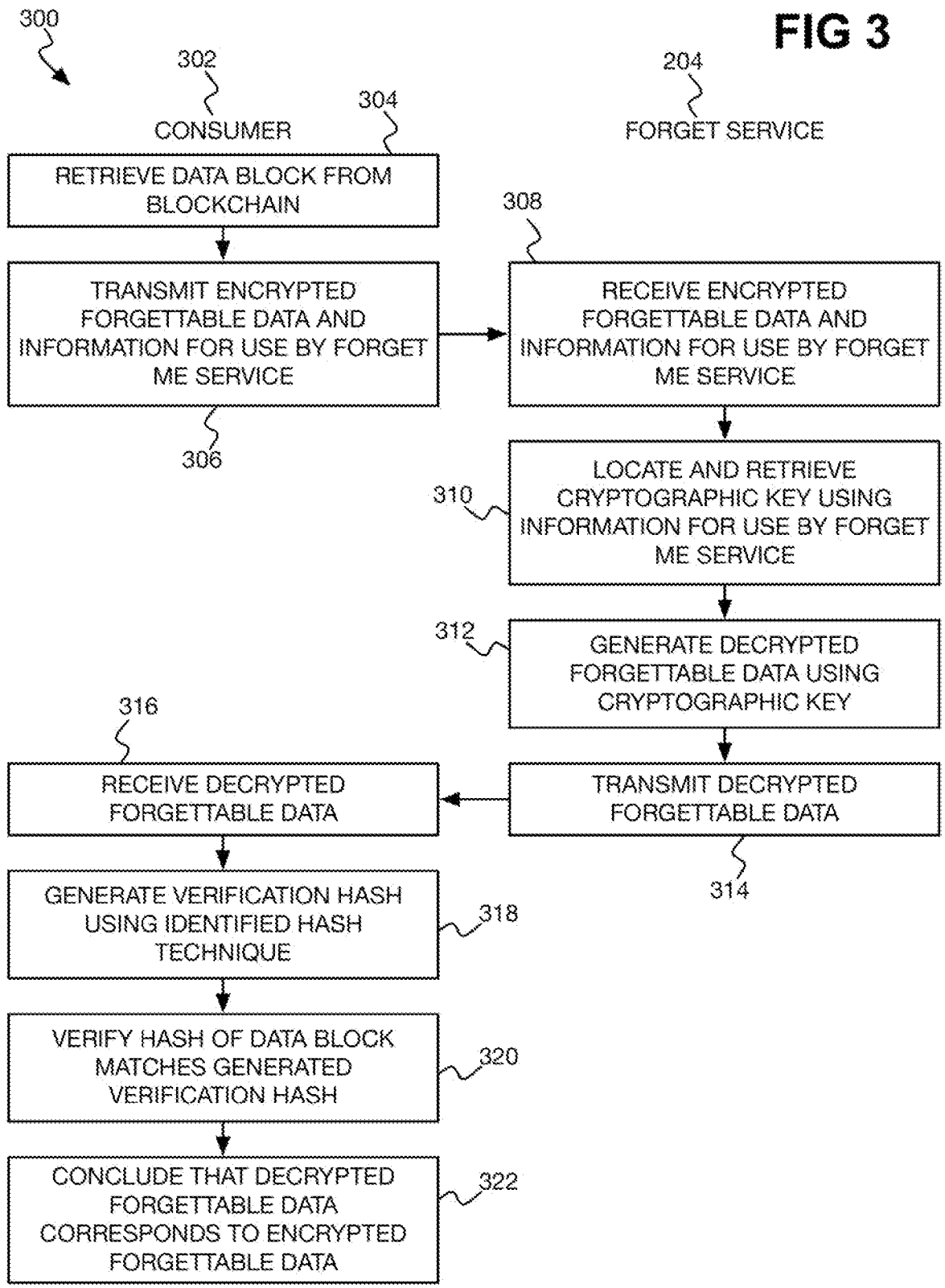
FIG. 3 is a flowchart of an example method for retrieving forgettable data from a blockchain.

FIG. 3 shows an example method 300 for retrieving forgettable data from a blockchain, such as from the blockchain data block 100 of FIG. 1. The parts of the method 300 in the left column are performed by a party that is referred to herein for distinguishing purposes only as a consumer 302. The consumer 302 may be a user or other type of entity. The parts of the method 300 in the right column are performed by the forget service 204 that guarantees forgetability of the forgettable data. The service 204 may be managed or run by an entity that provides the service 204 to the consumer 302.

The method 300 may be implemented as program code stored on non-transitory computer-readable data storage media. For example, a computing device of the consumer 302 may execute the program code to perform the parts of the method 300 in the left column. Similarly, a computing device of the forget service 204, which can be referred to as a forget service server, may execute the program code to perform the parts of the method 300 in the right column.

The consumer 302 retrieves a data block from a blockchain (304). The data block includes encrypted forgettable data, a hash of the forgettable data, and identification of the hash technique used to generate the hash from the forgettable data. The data block further includes identification of the server of the forget service 204 to which to transmit the encrypted forgettable data for decryption, and information for use by the forget service 204 to locate the cryptographic key used to decrypt the encrypted forgettable data.

The consumer 302 transmits the latter information retrieved and the encrypted forgettable data retrieved from the blockchain data block to the server of the forget service 204 identified in the data block (306). Upon receipt (308), the forget service 204 locates and retrieves the cryptographic key (assuming that the cryptographic key has not been destructed at behest of the party controlling forgettable of the forgettable data), using the information provided by the consumer 302 (310). As one example, this information may indicate a unique identifier of the cryptographic key by which the forget service 204 can locate the key within a database stored in TPM or other secure storage for retrieval.

The forget service 204 generates the decrypted forgettable data using the retrieved cryptographic key (312), and transmits the decrypted forgettable data back to the consumer 302 (314). The forget service 204 does not maintain any copy of the decrypted forgettable data. That is, once the decrypted forgettable data has been transmitted, the forget service 204 irreversibly destructs the decrypted forgettable data. Upon receipt, the consumer 302 does not have to take the forget service 204 at its word that the received decrypted data is the actual forgettable data that the encrypted form of which the consumer 302 retrieved from the blockchain data block in part 304. Rather, the consumer 302 can independently confirm that the decrypted data received from the forget service in part 314 is the forgettable data that is stored in encrypted fashion in the blockchain.

Specifically, using the hash technique identified in the retrieved data block, the consumer 302 generates a verification hash from the decrypted data that is purportedly the forgettable data stored in encrypted form in the data block (318). The consumer 302 verifies that the generated verification hash matches the hash stored in the retrieved data block of the blockchain (320). If the two hashes are identical, then the consumer 302 can conclude that the decrypted data received from the forget service 204 is actually the forgettable data stored in encrypted manner in the blockchain (322). That is, the consumer 302 can conclude that the decrypted forgettable data does indeed correspond to the encrypted forgettable data.

The hash stored in the data block thus ensures that guarantee of immutability of the forgettable data stored in the blockchain remains with the blockchain, and does not transfer to the forget service with the forget service's guarantee of forgetability of the forgettable data. If the forget service 204 were malicious or has been compromised, for example, and data returned in part 314 that is not actually the decrypted version of the forgettable data stored in encrypted form in the blockchain, the hash permits the consumer 302 to detect such incongruity. Specifically, the verification hash that the consumer 302 then generates from the returned data would not match the hash stored in the blockchain, because the hash stored in the blockchain was generated from the forgettable data.

In the examples that have been described with reference to FIGS. 1, 2, and 3, a blockchain data block includes encrypted forgettable data and corresponding control data. However, a blockchain data block can include multiple pieces of encrypted forgettable data, each with corresponding control data, and which are independently (i.e., separately) forgettable. Examples of such an implementation are now described in detail.

Figure 4:
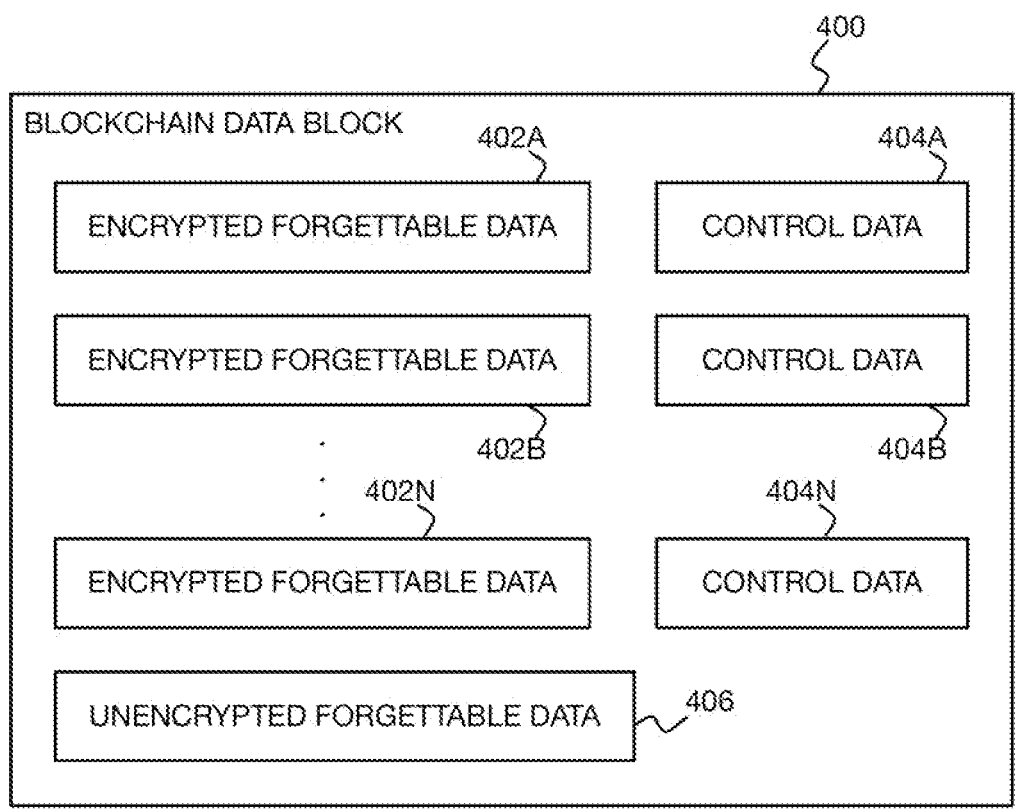
FIG. 4 is a diagram of an example blockchain data block including multiple pieces of encrypted forgettable data that are independently forgettable.

FIG. 4 shows such an example blockchain data block 400. The data block 400 include multiple pieces of encrypted forgettable data 402A, 402B, . . . , 402N, collectively referred to as the encrypted forgettable data 402. The data block 400 also includes multiple pieces of corresponding control data 404A, 404B, . . . , 404N, collectively referred to as the control data 404.

Each piece of control data 404 can be implemented as the control data 104 of FIG. 1. For instance, each piece of control data 404 can include a hash of the forgettable data that is stored in encrypted fashion as a corresponding piece of encrypted forgettable data 402, identification of the hash technique used to generate the hash, identification of a forget service server, and information for (internal) use by this server. Like the data block 100 of FIG. 1, the blockchain data block 400 can also include unencrypted unforgettable data 406 similar to the unforgettable data 114 of FIG. 1.

Each piece of encrypted forgettable data 402 can be generated based on a different cryptographic key. That is, each piece of encrypted forgettable data 402 can be decrypted using a different cryptographic key. Therefore, the forgettable data to which each piece of encrypted forgettable data 402 corresponds can be separately or independently forgotten. For example, destruction of the cryptographic key used to decrypt the encrypted forgettable data 402A does not affect decryptability of the encrypted forgettable data 402B, which is decrypted using a different cryptographic key.

Different parties can control the forgetability of different pieces of forgettable data to which the pieces of encrypted forgettable data 402 correspond. For example, one party may control the forgetability of the forgettable data to which the piece of encrypted forgettable data 402A corresponds, whereas another party may control the forgetability of the forgettable data to which the piece of encrypted forgettable data 402B corresponds. The former party may be able to authorize destruction of the cryptographic key used to decrypt the piece of encrypted forgettable data 402A by the forget service, whereas the latter party may be able to authorize destruction of the cryptographic key used to decrypt the piece of encrypted forgettable data 402B by the same or different service.

Figure 5:
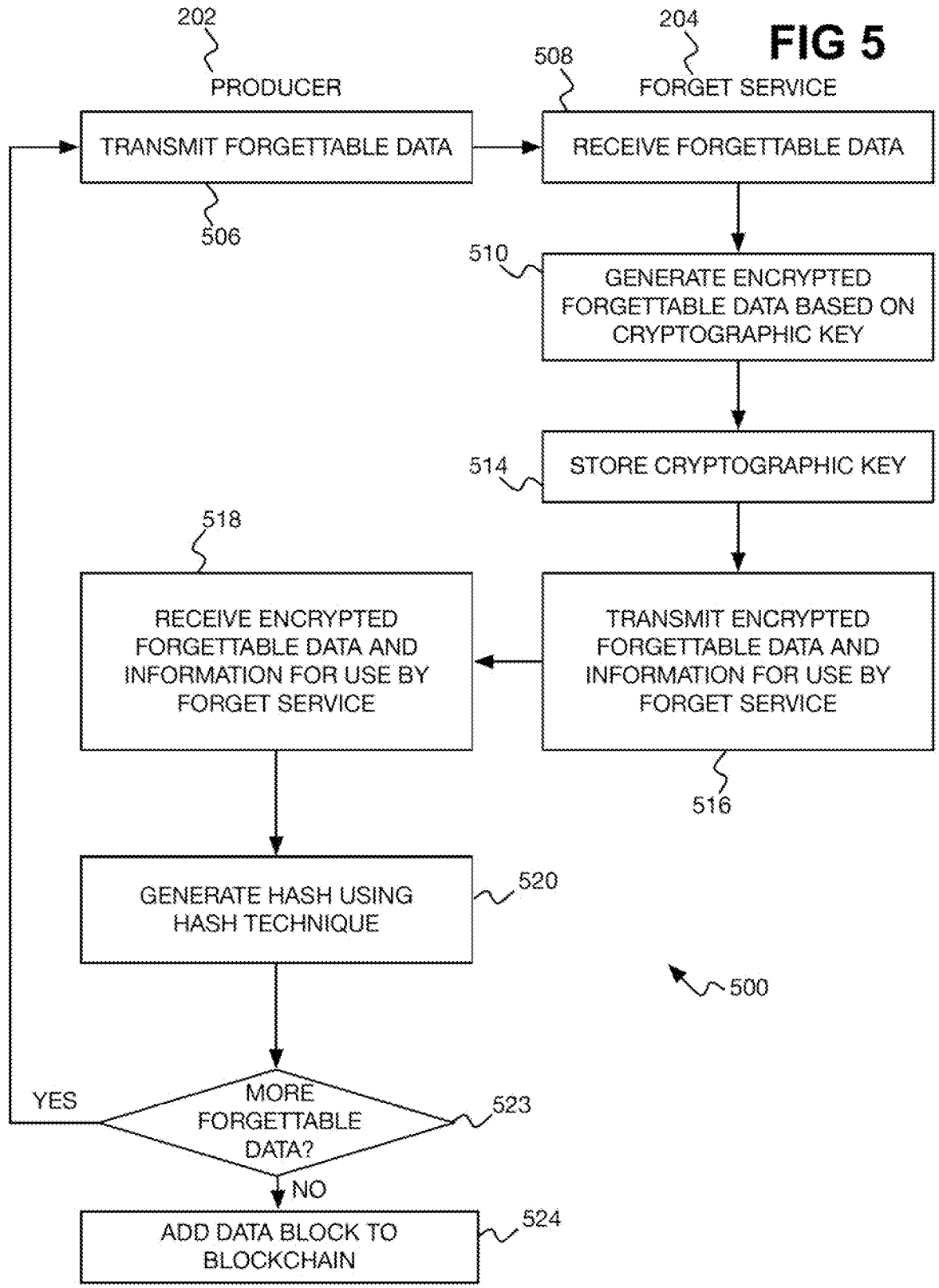
FIG. 5 is a flowchart of an example method for writing multiple pieces of forgettable data to a blockchain.

FIG. 5 shows an example method 500 for writing multiple pieces of forgettable data to a blockchain, such as to the blockchain data block 400 of FIG. 4. The parts of the method 500 in the left column are performed by the producer 202, whereas the parts of the method 500 in the right column are performed by the forget service 204. As with the methods 200 and 300, the method 500 may be implemented as program code stored on non-transitory computer-readable data storage media.

The producer 202 transmits a piece of forgettable data to the forget service 204 (506). Upon receipt (508), the forget service 204 generates a corresponding piece of encrypted forgettable data based on a cryptographic key that the destruction of which can be authorized by a party controlling forgetability of the piece of forgettable data (510). As in FIG. 2, the forget service 204 does not maintain any copy of the forgettable data. That is, once the forgettable data has been encrypted, the forget service 204 irreversibly destructs the received unencrypted forgettable data.

The forget service 204 stores the cryptographic key (514), in a secure manner. The forget service 204 maintains sole possession of the cryptographic key. For instance, no other party—including the party that controls forgetability of the piece of forgettable data received in part 508—has possession of the key. This ensures that the forget service 204 can guarantee forgetability of the forgettable data. For instance, if other parties also had possession of the cryptographic key, then destruction of the key at the forget service 204 would not result in forgetability of the forgettable data. This is because the encrypted forgettable data could still be decrypted using another copy of the cryptographic key in a different party's possession.

The forget service 204 transmits back to the producer 202 the piece of encrypted forgettable data generated in part 510, and (other) Information for (internal) use by the forget service 204 (516). As in the method 200 of FIG. 2, the latter information can include identifying information of the cryptographic key, to permit the forget service 204 to subsequently locate the key as stored in part 514. The producer 202 receives the piece of encrypted forgettable data, and the other information that the forget service 204 has transmitted (518).

Using a hash technique, the producer 202 generate a hash of the piece of forgettable data it transmitted to the forget service 204 in part 506 (520). The hash technique can differ for each different piece of forgettable data. If there are more pieces of forgettable data to be stored in the same data block of the blockchain (523), then the method 500 is repeated at part 502 with the next piece of forgettable data.

Once all such pieces of forgettable data have been processed (523), the producer 202 adds a data block to the blockchain (524). The data block can include, for each piece of forgettable data, the corresponding piece of encrypted forgettable data and the hash. Similar to the method 200 of FIG. 2, the data block can also include, for each piece of forgettable of data, identification of the hash technique used to generate the hash, other information that permits the forget service 204 to locate and use the stored cryptographic key, and identification of a server of the forget service 204.

In the example of FIG. 5, the same forget service 204 is used to generate each piece of encrypted forgettable data and its associated information like the hash. However, different forget services may instead be used to generate different pieces of encrypted forgettable data. As such, different forget services may guarantee the forgetability of different pieces of forgettable data that are stored in encrypted form in the same blockchain data block.

Similarly, different producers may transmit different pieces of forgettable data to the same or different forget services and subsequently verify that hashes received from the forget service(s) match hashes that the producers themselves generate from the respective pieces of forgettable data. One producer—or a different party altogether—may then be responsible for adding the data block to the blockchain. For example, a given producer may receive pieces of encrypted forgettable data and the associated information from the other producers for inclusion within the data block that the given producer adds to the blockchain.

Figure 6:
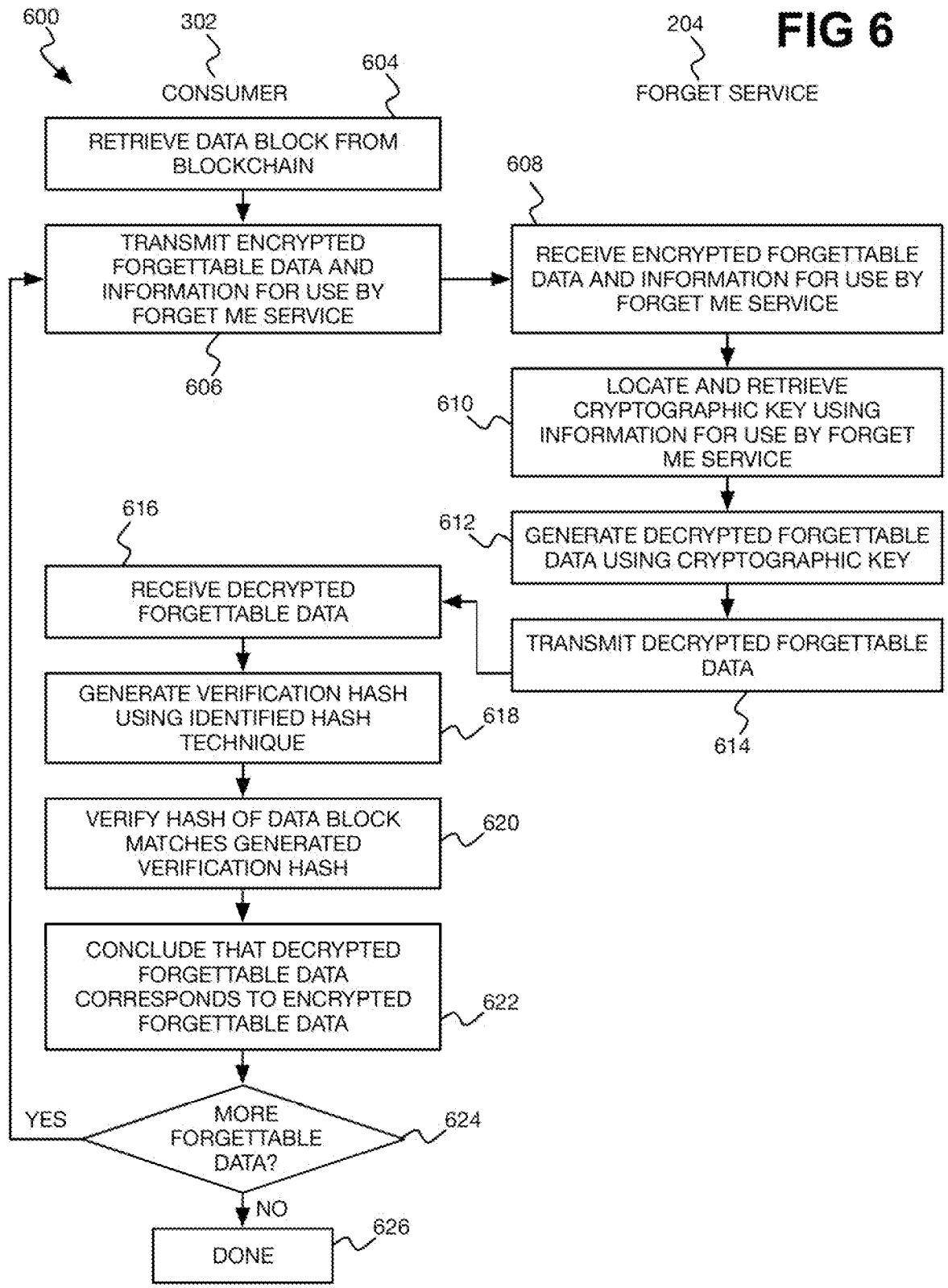
FIG. 6 is a flowchart of an example method for retrieving multiple pieces of forgettable data from a blockchain.

FIG. 6 shows an example method 600 for retrieving multiple pieces of forgettable data from a blockchain, such as from the blockchain data block 400 of FIG. 4. The parts of the method 600 in the left column are performed by the consumer 302, whereas the parts of the method 600 in the right column are performed by the forget service 204. As with the methods 200, 300, and 500, the method 600 may be implemented as program code stored on a non-transitory computer-readable data storage medium.

The consumer 302 retrieves a data block from a blockchain (604). The data block includes multiple pieces of encrypted forgettable data. For each piece of encrypted forgettable data, the data block includes a hash of the piece of forgettable data, and identification of the hash technique used to generate the hash. The data block may also include for each piece of encrypted forgettable data identification of the server of the forget service 204 to which to transmit the piece of encrypted forgettable data for decryption, and information for use by the forget service 204 to locate the cryptographic key used to decrypt the encrypted forgettable data.

The consumer 302 transmits the latter information and a piece of encrypted forgettable data to the identified server of the forget service 204 (606). Upon receipt (608), the forget service 204 locates and retrieves the cryptographic key used to decrypt the encrypted piece of forgettable data (assuming that the cryptographic key has not been destructed at behest of the party controlling forgetability of the piece of forgettable data), using the information provided by the consumer 302 (610). The forget service 204 generates the piece of decrypted forgettable data using the retrieved cryptographic key (612), and transmits it back to the consumer 302 (616). The forget service 204 does not maintain any copy of the decrypted forgettable data. That is, once the decrypted forgettable data has been transmitted, the forget service 204 irreversibly destructs the decrypted forgettable data.

Upon receipt (616), the consumer 302 generates a verification hash from the piece of decrypted forgettable data that is purportedly the piece of forgettable data stored in encrypted form in the data block (618). The consumer 302 verifies that the generated verification hash matches the hash stored for the piece of encrypted forgettable data in the retrieved data block of the blockchain (620). If the two hashes are identical, the consumer 302 concludes that the piece of decrypted data received from the forget service 204 is indeed the piece of forgettable data stored in encrypted fashion in the blockchain (622).

If there are additional pieces of encrypted forgettable data stored in the retrieved data block of the blockchain, then the method 600 is repeated at part 606 with the next piece of encrypted forgettable data. Once all such pieces of encrypted forgettable data have been processed (624), the method 600 is done (i.e., finished) (626). In this way, the consumer 302 is able to retrieve multiple pieces of forgettable data stored in the same data block of a blockchain.

In the example of FIG. 6, the consumer 302 processes all pieces of encrypted forgettable data stored in a blockchain data block. However, the consumer 302 may instead just process some pieces of encrypted forgettable data, and not other pieces of encrypted forgettable data. Furthermore, some pieces of encrypted forgettable data may not be able to be successfully processed, because their corresponding cryptographic keys may have been destructed at behest of the parties controlling the forgetability of the forgettable data in question.

In the example of FIG. 6, the same forget service 204 decrypts each piece of encrypted forgettable data. Stated another way, the same forget service 204 maintains the cryptographic keys for all the pieces of encrypted forgettable data. However, the data block may store pieces of encrypted forgettable data that are decryptable by different forget services. That is, different forget services may maintain the cryptographic keys for different pieces of encrypted forgettable data. In such instance, each piece of encrypted forgettable data may be transmitted in part 606 to a different forget service, specifically to the server that is identified in the control data for the piece of encrypted forgettable data in question. It is noted that reference to transmission of first and second encrypted data to respective first and second server computing devices can in this respect refer to the same or different servers.

In the examples that have been described with reference to FIGS. 4, 5, and 6, a blockchain data block includes multiple pieces of encrypted forgettable data, which are independently forgettable, along with respective pieces of control data. Different parties can thus control the forgetability of different pieces of encrypted forgettable data. However, a blockchain data block can include forgettable data of which multiple parties control the forgetability. That is, each party can cause the forgettable data to be forgotten, independent of the other parties (i.e., without receiving permission from any other party). Examples of such an implementation are now described in detail.

Figure 7:
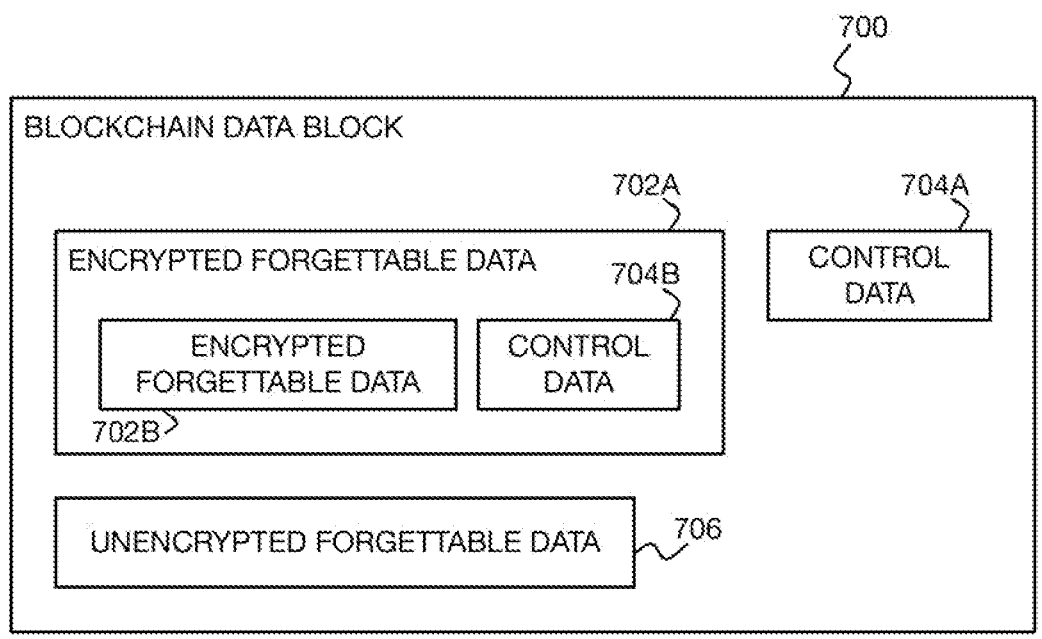
FIG. 7 is a diagram of an example blockchain data block in which the forgetability of forgettable data is independently controlled by multiple parties.

FIG. 7 shows such an example blockchain data block 700. The data block 700 includes encrypted forgettable data 702A and 702B, which are collectively referred to as the encrypted forgettable data 702, and respective control data 704A and 704B, which are collectively referred to as the control data 704. Each of the control data 704 can be implemented as the control data 104 of FIG. 1. As with the data block 100, the blockchain data block 700 can also include unencrypted unforgettable data 706.

The encrypted forgettable data 702B and its corresponding control data 704B are nested within the encrypted forgettable data 702A. That is, the encrypted forgettable data 702B and its corresponding control data 7048 are in effect the forgettable data that is stored in encrypted form as the encrypted forgettable data 702A. Such nesting effectively permits at least two parties to independently and separately control the forgettable data that is stored in encrypted form as the encrypted forgettable data 702B.

As an example, assume a first party (and not a second party) controls the forgetability of the forgettable data that is stored in encrypted form as the encrypted forgettable data 702A, and which includes the encrypted forgettable data 702B and its corresponding control data 704B. The first party (and not the second party) can cause destruction of a first cryptographic key by which the encrypted forgettable data 702A is decrypted. Assume the second party (and not the first party) controls the forgetability of the forgettable data that is stored in encrypted form as the encrypted forgettable data 702B. The second party (and not the first party) can cause destruction of a second cryptographic key by which the encrypted forgettable data 702B is decrypted.

This means that each party in effect controls the forgettable data that is stored in encrypted form as the encrypted forgettable data 7028, and can cause this forgettable data to be forgotten without having to receive approval or permission from the other party. The second party can cause destruction of the second cryptographic key by which the encrypted forgettable data 702B can be decrypted. This results in the forgettable data stored in encrypted form as the encrypted forgettable data 7028 being forgotten, such that the second party independently controls the forgetability of this forgettable data.

The first party can just directly cause destruction of the first cryptographic key by which the encrypted forgettable data 702A can be decrypted, and cannot directly cause destruction of the second cryptographic key by which the encrypted forgettable data 702B can be directed. Although destruction of the first cryptographic key directly causes just the forgettable data stored in encrypted form as the encrypted forgettable data 702A to be forgotten, such destruction also indirectly causes the forgettable data stored in encrypted form as the encrypted forgettable data 702B to be forgotten. This is because the now-forgotten forgettable data stored in encrypted form as the encrypted forgettable data 702A includes the encrypted forgettable data 7028 (and its associated control data 704B).

That is, if the encrypted forgettable data 702A can no longer be decrypted, then the encrypted forgettable data 702B and the control data 704B, which constitute the now-forgotten data stored in encrypted form as the encrypted forgettable data 702A, cannot be retrieved. This in turn means that the encrypted forgettable data 702B cannot be decrypted, since it (as well as the control data 704B) is irretrievable. Therefore, in effect the forgettable data stored in encrypted form as the encrypted forgettable data 702B is also forgotten when the first party independently causes the forgettable data stored in encrypted form as the encrypted forgettable data 702A to be forgotten.

It is noted that the nested forgettable data technique of FIG. 7 can be implemented in conjunction with the forgettable data technique of FIG. 4. As one example, the encrypted forgettable data 702A may include multiple pieces of encrypted forgettable data 402 and their corresponding control data 404. As another example, one more pieces of encrypted forgettable data 402 may include (different) nested encrypted forgettable data 702B and associated control data 704B.

FIGS. 8A and 8B show an example method 800 for writing forgettable data, the forgetability of which is independently controlled by at least two parties, to a blockchain, such as to the blockchain data block 700 of FIG. 7. The parts of the method 800 in the left column are performed by the producer 202, whereas the parts of the method 800 in the right column are preformed by the forget service 204. As with the methods 200, 300, 500, and 600, the method 800 may be implemented as program code stored on non-transitory computer-readable data storage media.

The producer 202 transmits forgettable data (i.e., the forgettable data that will be stored in encrypted form as the encrypted forgettable data 702B in FIG. 7) to the forget service 204 (806B). Upon receipt (808B), the forget service 204 generates the encrypted forgettable data 702B based on a second cryptographic key (810B). The destruction of the second cryptographic key can be authorized by a second party controlling forgetability of the forgettable data received in part 808B. The forget service 204 does not maintain any copy of the forgettable data. That is, once the forgettable data has been encrypted, the forget service 204 irreversibly destructs the received unencrypted forgettable data.

The forget service 204 stores the second cryptographic key (814B), in a secure manner. The forget service 204 maintains sole possession of the second cryptographic key. The forget service 204 transmits back to the producer 202 the encrypted forgettable data 702B generated in part 810B, and (other) information for use by the forget service 204 (816B). As in the method 200 of FIG. 2, the latter information can include identifying information of the second cryptographic key. The producer 202 receives the encrypted forgettable data 702B, and the other information that the forget service 204 transmitted in part 816B (818B).

Using a hash technique, the producer 202 generates a hash of the forgettable data transmitted to the forget service 204 in part 806B (820B). The hash, the identification of the hash technique, and the other information that the forget service 204 transmitted in part 816B form part of the control data 704B for the encrypted forgettable data 702B of FIG. 7. The control data 704B can also include identification of a server of the forget service 204.

The encrypted forgettable data 702B and the control data 704B themselves constitute additional forgettable data (i.e., the forgettable data that will be stored in encrypted form as the encrypted forgettable data 702A in FIG. 7). The producer 202 transmits this additional forgettable data to the forget service 204 (806A). Upon receipt (808A), the forget service 204 generates the encrypted forgettable data 702A based on a first cryptographic key (810A). The destruction of the first cryptographic key can be authorized by a first party controlling forgetability of the additional forgettable data received in part 808A. The forget service 204 does not maintain any copy of the additional forgettable data. That is, once the additional forgettable data has been encrypted, the forget service 204 irreversibly destructs the received additional forgettable data.

The forget service 204 stores the first cryptographic key (814A), in a secure manner. The forget service 204 maintains sole possession of the first cryptographic key. The forget service 204 transmits back to the producer 202 the encrypted forgettable data 702A generated in part 810A, and (other) information for use by the forget service 204 (816A). As in the method 200 of FIG. 2, the latter information can include identifying information of the first cryptographic key. The producer 202 receives the encrypted forgettable data 702A, and the other information that the forget service 204 transmitted in part 816A (818A).

Using a hash technique, the producer 202 generates a verification hash of the additional forgettable data transmitted to the forget service 204 in part 806A (820A). The hash, the identification of the hash technique, and the other information that the forget service 204 transmitted in part 816A form part of the control data 704A for the encrypted forgettable data 702A of FIG. 7. The control data 704A can also include identification of a server of the forget service 204.

The producer 202 adds a data block to the blockchain (824), such as the data block 700 of FIG. 7. The added data block includes the encrypted forgettable data 702A and the control data 704A. The forgettable data stored in encrypted fashion as the encrypted forgettable data 702A in turn includes the encrypted forgettable data 702B and the control data 704B. Therefore, the added data block effectively includes the encrypted forgettable data 702B and the control data 704B as well.

In the example of FIGS. 8A and 8B, the same forget service 204 is used to generate both the encrypted forgettable data 702B and 702A, and their respective control data 704B and 704A. However, different forget services may instead be used. As such, different forget services may separately and independently effectively guarantee the forgetability of the forgettable data stored in encrypted form in the blockchain data block as the encrypted forgettable data 702B.

Furthermore, in the example of FIGS. 8A and 8B, the same producer 202 transmits to the forget service 204 both the forgettable data to which the encrypted forgettable data 702B corresponds and the additional forgettable data to which the encrypted forgettable data 702A corresponds. However, in another implementation, one producer may be transmit the former forgettable data to the forget service 204, and then transmit the subsequently received encrypted forgettable data 702B and control data 704B to another producer. This latter producer transmits the encrypted forgettable data 702B and the control data 704B as the additional forgettable data to the forget service 204.

Figure 9A:
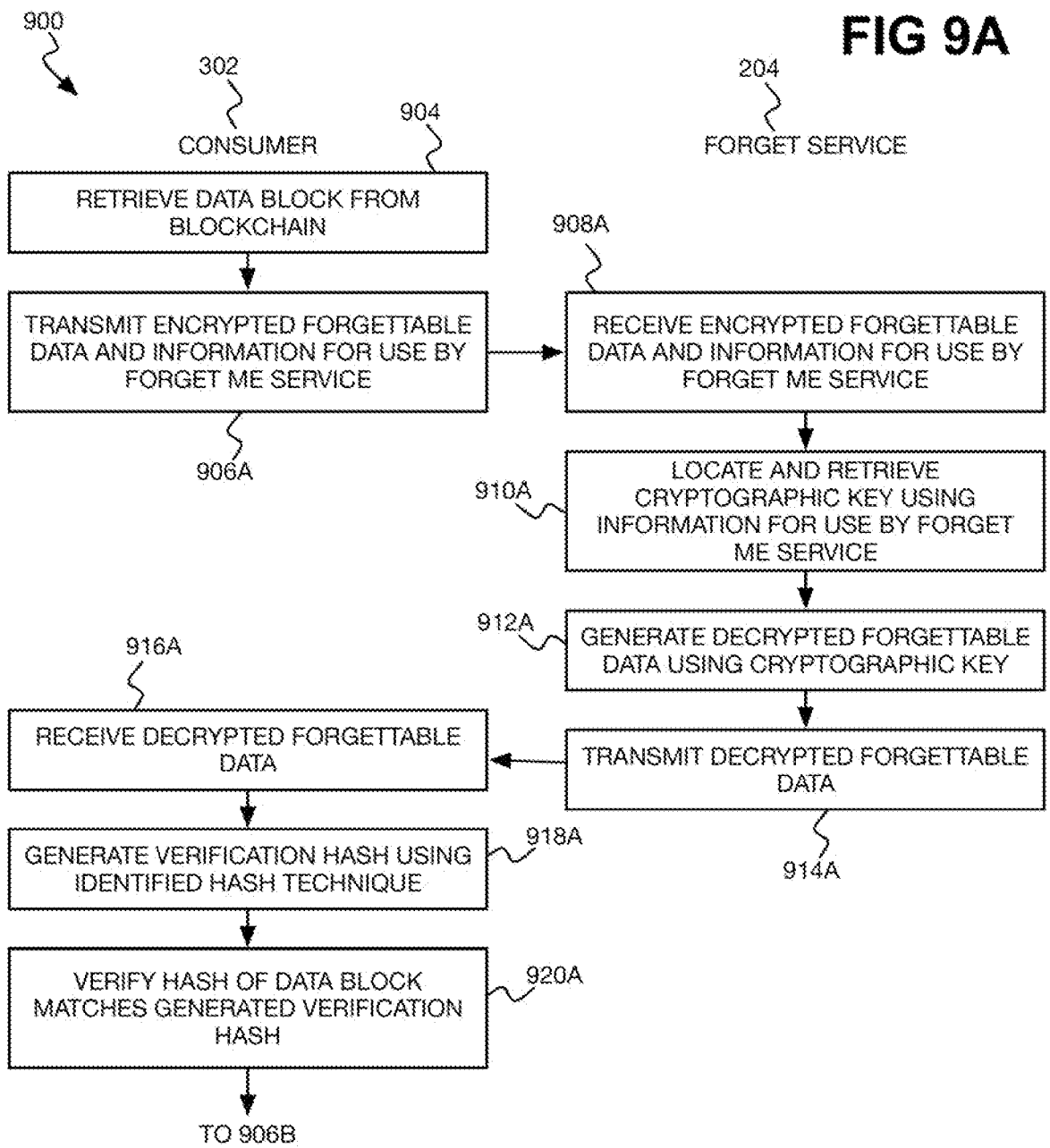

FIGS. 9A and 9B show an example method 900 for retrieving forgettable data, the forgetability of which is independently controlled by at least two parties, from a blockchain, such as from the blockchain data block 700 of FIG. 7. The parts of the method 900 in the left column are performed by the consumer 302, whereas the parts of the method 900 in the right column are performed by the forget service 204. As with the methods 200, 300, 500, 600, and 800, the method 900 may be implemented as program code stored on a non-transitory computer-readable data storage medium.

The consumer 302 retrieves a data block from a blockchain (904), such as the data block 700. The data block 700 includes the encrypted forgettable data 702A and the control data 704A. The consumer 302 transmits the encrypted forgettable data 702A to the forget service 204, as well as the information within the control data 704A for use by the forget service 204 to locate the first cryptographic key used to decrypt the encrypted forgettable data 702A (906A). For instance, the consumer 302 may transmit the foregoing to a server of the forget service 204 identified in the control data 704A.

The forget service 204 receives the encrypted forgettable data 702A and the information within the control data 704A for use by the forget service 204 to locate the first cryptographic key used to decrypt the encrypted forgettable data 702A (908A). The forget service 204 locates and retrieves the first cryptographic key (assuming it has not been destructed at behest of the party controlling forgetability of the corresponding forgettable data), using the information provided by the consumer 302 (910A). The forget service 204 generates the decrypted forgettable data using the retrieved first cryptographic key (912A), and transmits it back to the consumer 302 (914A). The forget service 204 does not maintain any copy of the decrypted forgettable data. That is, once the decrypted forgettable data has been transmitted, the forget service 204 irreversibly destructs the decrypted forgettable data.

The consumer 302 receives the decrypted forgettable data (916A), which is, encompasses, or includes the encrypted forgettable data 702B and the associated control block 704B. The consumer 302 generates a verification hash from the decrypted forgettable data that is purportedly the forgettable data stored in encrypted form as the encrypted forgettable data 702A (918A), in which the encrypted forgettable data 702B and the control block 704B are nested. The consumer 302 verifies that the generated verification hash matches the hash stored within the control data block 704A (920A).

If the two hashes are identical, the consumer 302 has now successfully retrieved the encrypted forgettable data 702B its associated control block 704B, since they constitute or are part of the decrypted forgettable data received in part 916A from the forget service 204. The consumer 302 next transmits to the forget service 204 the encrypted forgettable data 702B, as well as the information within the control data 704B for use by the forget service 204 to locate the second cryptographic key used to decrypt the encrypted forgettable data 702B (906B). For instance, the consumer 302 may transmit the foregoing to a server of the forget service 204 identified in the control data 704B.

The forget service 204 receives the encrypted forgettable data 702B and the information within the control data 704A for use by the forget service 204 to locate the second cryptographic key used to decrypt the encrypted forgettable data 702B (908B). The forget service 204 locates and retrieves the second cryptographic key (assuming it has not been destructed at behest of the party controlling forgetability of the corresponding forgettable data), using the information provided by the consumer 302 (910B). The forget service 204 generates the decrypted forgettable data using the retrieved second cryptographic key (912B), and transmits it back to the consumer 302 (914B). The forget service 204 does not maintain any copy of the decrypted forgettable data. That is, once the decrypted forgettable data has been transmitted, the forget service 204 irreversibly destructs the decrypted forgettable data.

Upon receipt (916B), the consumer 302 generates a verification hash from the decrypted forgettable data that is purportedly the forgettable data stored in encrypted form as the encrypted forgettable data 702B (918B). The consumer verifies that the generated verification hash matches the hash of the control block 704B (920B). If the two hashes are identical, the consumer 302 concludes that the decrypted data received from the forget service in part 916B is indeed the forgettable data stored in encrypted fashion as the encrypted forgettable data 702B in the blockchain (922).

In the example of FIGS. 9A and 9B, the same forget service 204 decrypts both the encrypted forgettable data 702A and 702B. Stated another way, the same forget service 204 maintains the first cryptographic key used to decrypt the encrypted forgettable data 702A and the second cryptographic key used to decrypt the encrypted forgettable data 702B. However, the encrypted forgettable data 702A and 702B may be decryptable by different forget services. That is, one forget service may maintain the first cryptographic key and a different forget service may maintain the second cryptographic key. In such instance, parts 908A, 910A, 912A, and 914A are performed by the former forget service, and parts 908B, 910B, 912B, and 914B are performed by the latter forget service.

In the examples that have been described with reference to FIGS. 7, 8, and 9, a blockchain data block includes encrypted forgettable data 702A in which encrypted forgettable data 702B (as well as its associated control data 704B) is nested. Destruction of either or both the first cryptographic key used to decrypt the encrypted forgettable data 702A and the second cryptographic key used to decrypt the encrypted forgettable data 702B thus results in the forgettable data corresponding to the forgettable data 702B being forgotten. That is, there is one nesting layer such that the destruction of either or both of two cryptographic keys results in forgetting of the forgettable data stored in encrypted form as the innermost nested encrypted forgettable data.

However, the examples can be extended so that there are N>1 nesting layers so that destruction of any of N+1 cryptographic keys results in forgetting of the forgettable data stored in encrypted form as the innermost nested encrypted forgettable data. For example, if there are two nesting layers, then the forgettable data that is stored in encrypted form as the encrypted forgettable data 702B may include third encrypted forgettable data and an associated third control block. That is, the third encrypted forgettable data is nested within the encrypted forgettable data 702B that itself is nested within the encrypted forgettable data 702A. A third cryptographic key is used to decrypt the third encrypted forgettable data.

In this example, any of the first cryptographic key used to decrypt the encrypted forgettable data 702A, the second cryptographic key used to decrypt the encrypted forgettable data 702B, and the third encrypted cryptographic key used to decrypt the third encrypted forgettable data can be destructed to forget the forgettable data stored in encrypted form as the third encrypted forgettable data. Three different parties may control the three cryptographic keys. Therefore, each of these three parties independently and separately controls the forgetability of the forgettable data stored in encrypted form as the third encrypted forgettable data.

FIG. 10 shows an example method 1000 for forgetting forgettable data stored in a blockchain in encrypted form. The parts of the method 300 in the left column are performed by a party that is referred to herein as the forgetability-controlling party 1002 only for distinguishing purposes. The parts of the method 300 in the right column are performed by the forget service 204.

The method 1000 may be implemented as program code stored on non-transitory computer-readable data storage media. For example, a computing device of the forgetability-controlling party 1002 may execute the program code to perform the parts of the method 1000 in the left column. Similarly, a computing device of the forget service 204, which can be referred to as a forget service server, may execute the program code to perform the parts of the method 1000 in the right column.

In the example of FIG. 10, the forgetability-controlling party 1002 adds another data block to the blockchain including the data block that stores in encrypted form the forgettable data of which the party 1002 controls the forgetability (1006). The data block includes a request to forget the forgettable data. The forget service 204 may have a node, such as a server, that is part of the infrastructure underlying the blockchain. As such, the forget service 204 receives all added data blocks to the blockchain, and thus can detect the addition of the data block requesting that the forgettable data be forgotten (1008). It is noted that usage of an additional data block to request that forgettable data be forgotten is one particular implementation, and in other implementations, the forgetting of forgettable data may be requested in other ways, such as via a request sent directly to the forget service 204.

The forget service 204 can authenticate the request to forget the forgettable data (1010). For example, the forgetability-controlling party 1002 may have signed the request with its private cryptographic key. The forget service 204 can thus authenticate that the request originated from the forgetability-controlling party 1002 by authenticating the signed request against the corresponding public cryptographic key of the party 1002. The request can be authenticated in a different way as well. More generally, the forget service 204 authenticates that the request originated from the party 1002 that controls forgetability of the forgettable data via having authorization to destruct the cryptographic key used to decrypt the forgettable data from an encrypted version thereof stored in a blockchain data block.

The forget service 204 responsively locates the cryptographic key used to decrypt the encrypted forgettable data to be forgotten (1012). The forget service 204 locates the cryptographic key using the identifying information stored as part of the control data within the blockchain data block storing the forgettable data in encrypted form. The forget service 204 then destructs the cryptographic key (1014), rendering the forgettable data forgotten. This is because the forget service 204 possesses the sole copy of the cryptographic key used to decrypt the encrypted forgettable data, such that the forgettable data can no longer be decrypted. The forget service 204 destructs the cryptographic key in that it deletes or removes the cryptographic key in an irreversible manner.

Irreversible destruction of the cryptographic key may also be referring to as secure data wiping or secure erasure. Such irreversible destruction may be achieved in a number of different ways. For example, the cryptographic key may be overwritten with different patterns and over multiple passes according to different specifications. The US Department of Defense has promulgated one such standard, DoD 5220.22-M, which dictates a three-pass approach for data sanitization. In the first step, the data is overwritten with binary zeros, and in the second step, the data is overwritten with binary ones. In the third step, the data is overwritten with a random bit pattern.

Figure 11:
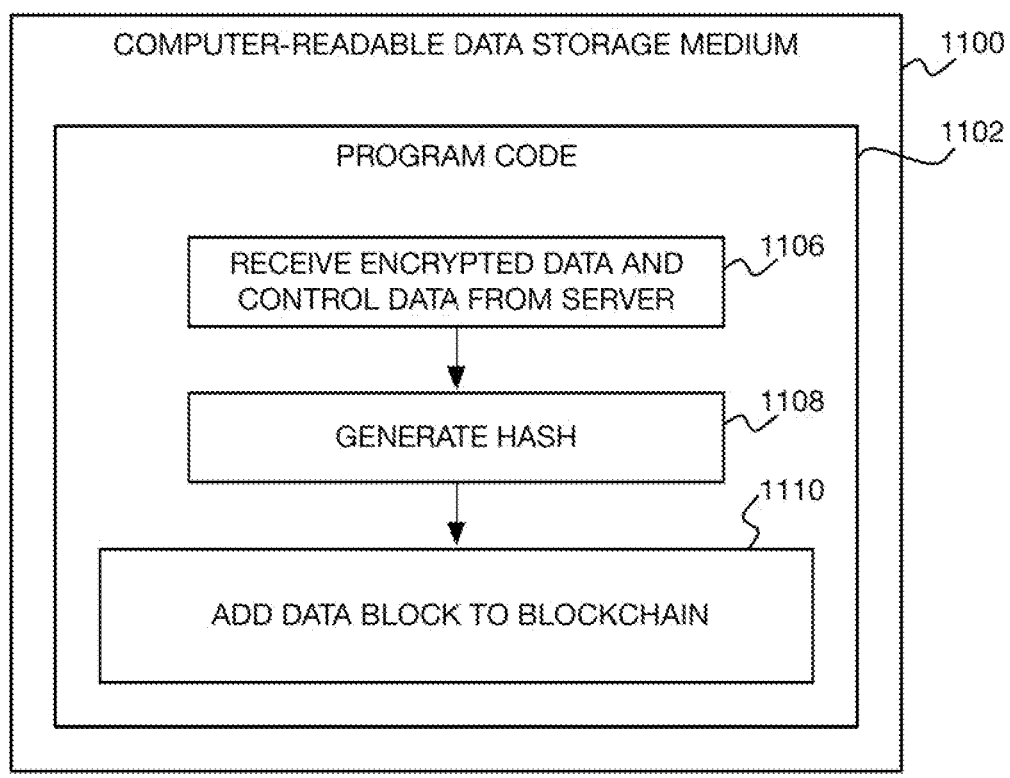
FIG. 11 is a diagram of an example computer-readable data storage medium.

FIG. 11 shows an example non-transitory computer-readable data storage medium 1100. The computer-readable storage medium 1100 stores program code 1102 code executable by a computing device, such as that of a producer, to perform processing. The processing includes receiving from a server computing device, such as that of a forget service, encrypted data corresponding to forgettable data (1106), and generating a hash of the forgettable data (1108). The processing includes adding a data block including the first encrypted data and control data including the hash to a blockchain (1110).

Figure 12:
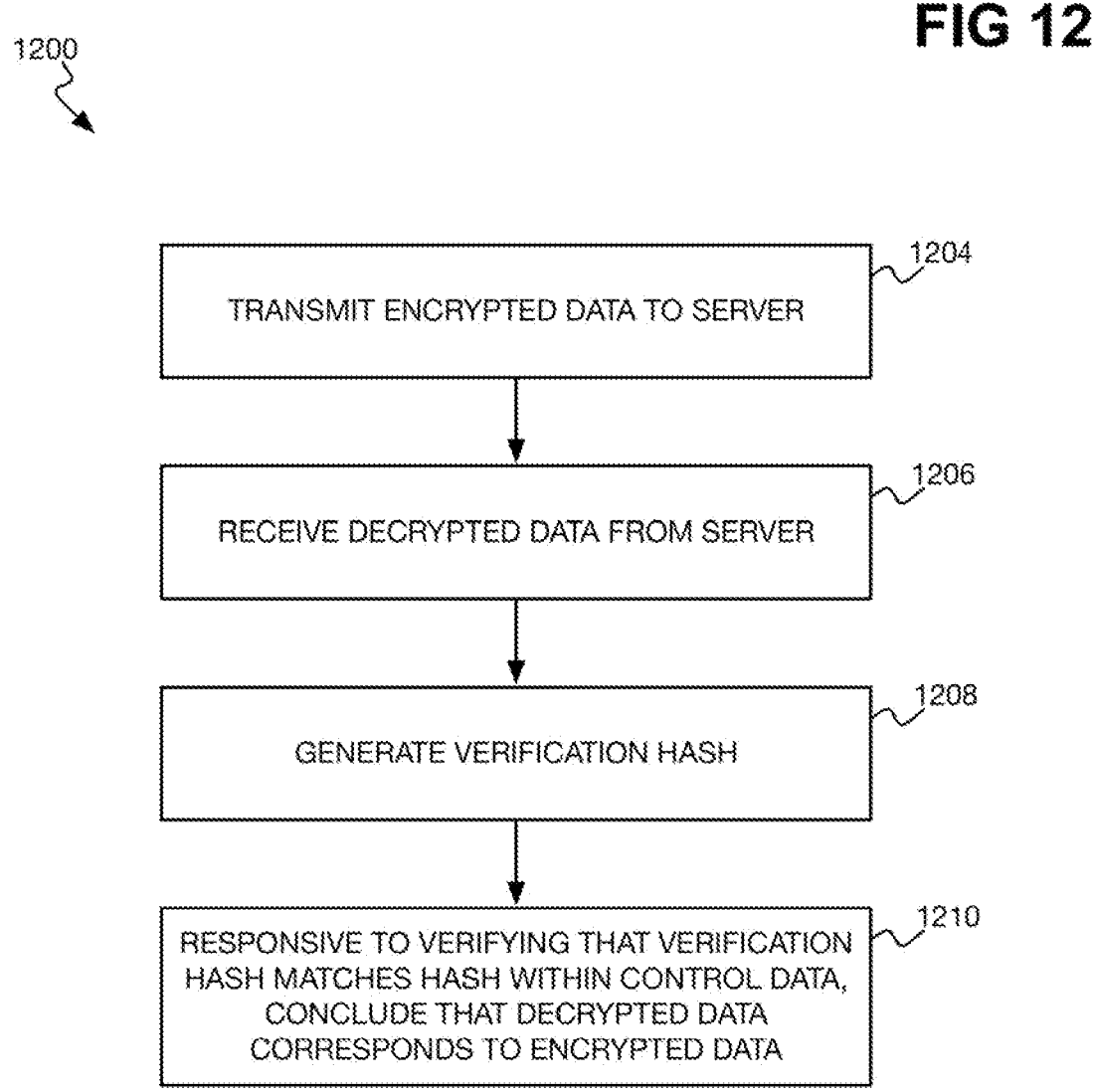
FIG. 12 is a flowchart of an example method.

FIG. 12 shows an example method 1200. The method 1200 includes transmitting, by a computing device (such as that of a consumer) encrypted data of a data block of a blockchain to a server computing device (such as that of a forget service) (1204). The data block further includes control data including a hash of forgettable data to which the encrypted data corresponds. The method 1200 includes receiving, by the computing device, decrypted data that allegedly is the forgettable data, from the server computing device (1206), and generating, by the computing device, a verification hash of the decrypted data (1208). The method 1200 includes, responsive to verifying that the generated verification hash matches the hash, concluding, by the computing device, that the decrypted data is the forgettable data (1210).

Figure 13:
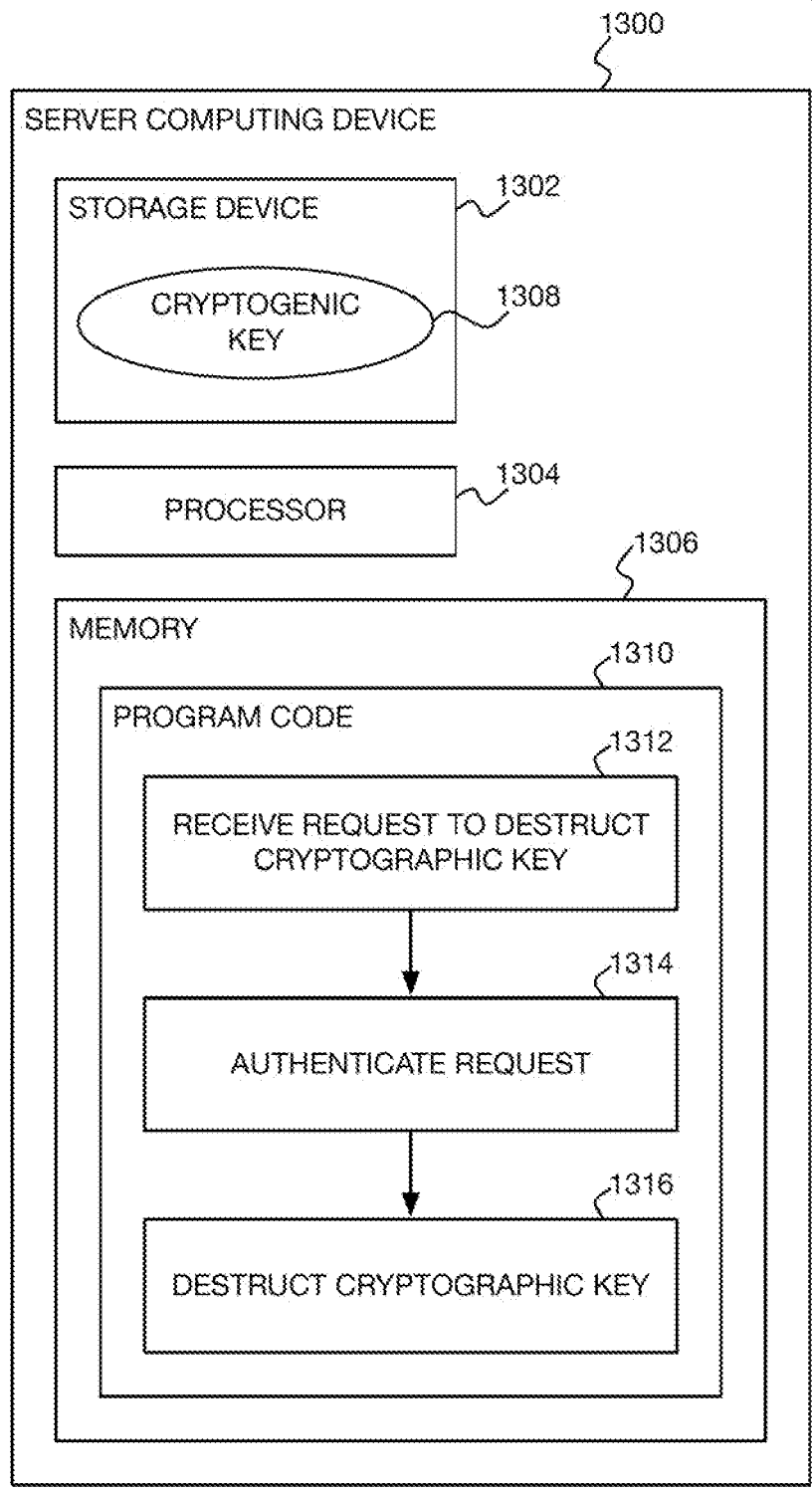
FIG. 13 is a diagram of an example server computing device.

FIG. 13 shows an example server computing device 1300, such as that of a forget service. The server computing device 1300 includes a storage device 1302, like a TPM, to store a sole copy of a cryptographic key (1308) used to decrypt forgettable data from encrypted data of a data block of a blockchain. The server computing device includes a processor 1304 and memory 1306 storing program code 1310. The program code 1310 is executable by the processor to receive a request to destruct the cryptographic key 1308 (1312), authenticate the request (1314), and responsive to authenticating the request, destruct the cryptographic key (1316).

Techniques have been described herein permits a blockchain to be used for storage of forgettable data. In the described techniques, forgettable data is stored in the blockchain in encrypted form. A forget service solely possesses the cryptographic key needed to decrypt the forgettable data. To ensure that immutability of the forgettable data remains guaranteed by the blockchain, a hash of the forgettable data can be stored with the encrypted version of the forgettable data in the blockchain. As such, the forget service guarantees just the forgetability of the data, and not the immutability of the forgettable data.

We claim:

1. A non-transitory computer-readable data storage medium storing program code executable by a computing device to perform processing comprising:
receiving, from a server computing device, first encrypted data corresponding to first forgettable data;
generating a first hash of the first forgettable data; and
adding a data block including the received first encrypted data and first control data including the first hash to a blockchain,
wherein a party controls forgetability of the first forgettable data by authorizing destruction, at the server computing device, of a cryptographic key used to decrypt the first forgettable data from the first encrypted data, wherein immutability of the first forgettable data is guaranteed by the blockchain and not by the server computing device via the first hash permitting independent verification that decrypted data generated by the server computing device from the first encrypted data is the first forgettable data, such that providing by the server computing device of data other than the decrypted data in response to the first encrypted data is detectable using the first hash, and wherein just the forgetability of the first forgettable data is guaranteed by the server computing device via the server computing device solely possessing the cryptographic key and responsively destructing the cryptographic key at behest of the party.

2. The non-transitory computer-readable data storage medium of claim 1, wherein the first control data further includes identification of a hash technique used to generate the first hash.

3. The non-transitory computer-readable data storage medium of claim 1, wherein the data block added to the blockchain further includes second encrypted data and second control data, the second encrypted data corresponding to second forgettable data, the second control data including a second hash of the second forgettable data.

4. The non-transitory computer-readable data storage medium of claim 3, wherein the party is a first party and controls forgetability of the first forgettable data via having authorization to destruct a first cryptographic key used to decrypt the first forgettable data from the first encrypted data,
wherein a second party controls forgetability of the second forgettable data via having authorization to destruct a second cryptographic key used to decrypt the second forgettable data from the second encrypted data,
wherein the forgetability of the first forgettable data and the forgetability of the second forgettable data are independent of one another.

5. The non-transitory computer-readable data storage medium of claim 1, wherein the first forgettable data comprises second encrypted data and second control data, the second encrypted data corresponding to second forgettable data, the second control data including a second hash of the second forgettable data.

6. The non-transitory computer-readable data storage medium of claim 5, wherein the party is a first party, and the first party and a second party individually and independently control forgetability of the second forgettable data,
wherein the first party controls the forgetability of the second forgettable data via having authorization to destruct a first cryptographic key used to decrypt, from the first encrypted data, the first forgettable data that includes the second encrypted data corresponding to the second forgettable data,
and wherein the second party controls the forgetability of the second forgettable data via having authorization to destruct a second cryptographic key used to decrypt the second forgettable data from the second encrypted data included within the first forgettable data to which the first encrypted data corresponds.

7. A method comprising:
transmitting, by a computing device, first encrypted data of a data block of a blockchain to a first server computing device, the data block further including first control data, the first control data including a first hash of first forgettable data to which the first encrypted data corresponds;

receiving, by the computing device, first decrypted data that allegedly is the first forgettable data, from the first server computing device;
generating, by the computing device, a first verification hash of the first decrypted data; and
responsive to verifying that the generated first verification hash matches the first hash, concluding, by the computing device, that the first decrypted data is the first forgettable data,
wherein a party controls forgetability of the first forgettable data by authorizing destruction, at the first server computing device, of a cryptographic key used to decrypt the first forgettable data from the first encrypted data,
wherein immutability of the first forgettable data is guaranteed by the blockchain and not by the first server computing device via the first hash permitting independent verification that the first decrypted data generated by the first server computing device from the first encrypted data is the first forgettable data, such that providing by the first server computing device of data other than the first decrypted data in response to the first encrypted data is detectable using the first hash,
and wherein just the forgetability of the first forgettable data is guaranteed by the first server computing device via the first server computing device solely possessing the cryptographic key and responsively destructing the cryptographic key at behest of the party.

8. The method of claim 7, wherein the first control data further includes identification of a hash technique allegedly used to generate the first hash, and identification of the first server computing device,
wherein the first encrypted data is transmitted to the identified first server computing device,
and wherein the first verification hash of the first decrypted data is generated using the identified hash technique.

9. The method of claim 7, wherein the data block of the blockchain further includes second encrypted data and second control data, the second control data including a second hash of second forgettable data to which the second encrypted data corresponds,
and wherein the method further comprises:
transmitting, by the computing device, the second encrypted data of the data block of the blockchain to a second server computing device;
receiving, by the computing device, second decrypted data that allegedly is the second forgettable data, from the second server computing device;
generating, by the computing device, a second verification hash of the second decrypted data; and
responsive to verifying that the generated second verification hash matches the second hash of the second control data, concluding, by the computing device, that the second decrypted data is the second forgettable data.

10. The method of claim 9, wherein the party is a first party and controls forgetability of the first forgettable data via having authorization to destruct a first cryptographic key used to decrypt the first forgettable data from the first encrypted data,
wherein a second party controls forgetability of the second forgettable data via having authorization to destruct a second cryptographic key used to decrypt the second forgettable data from the second encrypted data, wherein the forgetability of the first forgettable data and the forgetability of the second forgettable data are independent of one another.

11. The method of claim 7, wherein the first forgettable data comprises second encrypted data and second control data, the second control data including a second hash of second forgettable data to which the second encrypted data corresponds, and wherein the method further comprises:
transmitting, by the computing device, the second encrypted data to a second server computing device;
receiving, by the computing device, second decrypted data that allegedly is the second forgettable data, from the second server computing device;
generating, by the computing device, a second verification hash of the second decrypted data; and
responsive to verifying that the generated second verification hash matches the second hash of the second control data, concluding, by the computing device, that the second decrypted data is the second forgettable data to which the second encrypted data corresponds.

12. The method of claim 11, wherein the party is a first party, and the first party and a second party individually and independently control forgetability of the second forgettable data, and wherein the first party controls the forgetability of the second forgettable data via having authorization to destruct a first cryptographic key used to decrypt, from the first encrypted data, the first forgettable data that includes the second encrypted data corresponding to the second forgettable data.

13. The method of claim 12, wherein the second party controls the forgetability of the second forgettable data via having authorization to destruct a second cryptographic key used to decrypt the second forgettable data from the second encrypted data included within the first forgettable data to which the first encrypted data corresponds.

14. A server computing device comprising:
a storage device to store a sole copy of a cryptographic key used to decrypt forgettable data from encrypted data of a data block of a blockchain, wherein the data block further includes control data including a hash of the forgettable data;
a processor; and
a memory storing program code executable by the processor to:
receive a request to destruct the cryptographic key;
authenticate the request by authenticating that the request originated from a party controlling forgetability of the forgettable data to which the encrypted data corresponds via having authorization to destruct the cryptographic key at the server computing device; and
responsive to authenticating the request, destruct the cryptographic key,
wherein immutability of the forgettable data is guaranteed by the blockchain and not by the server computing device via the hash permitting independent verification that decrypted data generated by the server computing device from the encrypted data is the forgettable data, such that providing by the server computing device of data other than the decrypted data in response to the encrypted data is detectable using the hash, and wherein just the forgetability of the forgettable data is guaranteed by the server computing device via the server computing device solely possessing the cryptographic key and responsively destructing the cryptographic key at behest of the party.

15. The server computing device of claim 14, wherein the data block is a first data block of the blockchain,
and wherein the processor receives the request by detecting addition of a second data block to the blockchain, the second data block including the request.

16. The server computing device of claim 14, wherein the request is signed by a private cryptographic key of the party controlling forgetability of the forgettable data by receiving authorization to destruct the cryptographic key at the server computing device,
wherein the processor authenticates the request by authenticating the signed request against a public cryptographic key of the party.

17. The server computing device of claim 14, wherein the data block further includes control data including identifying information of the cryptographic key within the storage device, and the program code is executable by the processor to further:
responsive to authenticating the request, locate the cryptographic key within the storage device using the identifying information.

18. The server computing device of claim 14, wherein the program code is executable by the processor to further:
receive the forgettable data from a computing device;
generate the encrypted data from the received forgettable data based on the cryptographic key; and
transmit the encrypted data to the computing device.

19. The server computing device of claim 18, wherein the program code is executable by the processor to further:
store the cryptographic key within the storage device; and
transmit, to the computing device identifying information of the cryptographic key within the storage device.

20. The server computing device of claim 14, wherein the program code is executable by the processor to further:
receive the encrypted data from a computing device;
generate decrypted data from the encrypted data using the cryptographic key; and
transmit the decrypted data to the computing device.

21. The server computing device of claim 20, wherein the data block further includes control data including identifying information of the cryptographic key within the storage device, and the program code is executable by the processor to further:
receive the identifying information from the computing device; and
locate and retrieve the cryptographic key within the storage device using the identifying information.

* * * * *